(12) United States Patent
Wang et al.

(10) Patent No.: US 8,665,111 B2
(45) Date of Patent: *Mar. 4, 2014

(54) SYSTEMS AND METHODS FOR MODIFYING POWER USAGE

(76) Inventors: Jackson Kit Wang, Toronto (CA); Calvin Daniel Koskowich, Lethbridge (CA); John Paul Harvey, Caledon East (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/476,967

(22) Filed: May 21, 2012

(65) Prior Publication Data

US 2013/0038468 A1 Feb. 14, 2013

Related U.S. Application Data

(63) Continuation of application No. 11/885,928, filed as application No. PCT/US2006/008705 on Mar. 8, 2006, now Pat. No. 8,183,995.

(60) Provisional application No. 60/659,455, filed on Mar. 8, 2005, provisional application No. 60/379,439, filed on May 9, 2005.

(51) Int. Cl.
G08B 23/00 (2006.01)

(52) U.S. Cl.
USPC .................................................. 340/870.02

(58) Field of Classification Search
USPC ............... 340/539.1, 870.01, 870.11–870.15, 340/310.01–310.06, 13.24; 700/22
See application file for complete search history.

(56) References Cited

U.S. PATENT DOCUMENTS

| | | | | |
|---|---|---|---|---|
| 5,956,462 A * | 9/1999 | Langford | ....................... | 392/449 |
| 6,633,823 B2 * | 10/2003 | Bartone et al. | ................... | 702/57 |
| 7,049,976 B2 * | 5/2006 | Hunt et al. | ............... | 340/870.02 |
| 7,965,174 B2 * | 6/2011 | Wong et al. | ............. | 340/286.02 |
| 2006/0123807 A1 * | 6/2006 | Sullivan et al. | ................. | 62/129 |

* cited by examiner

*Primary Examiner* — Phung Nguyen
(74) *Attorney, Agent, or Firm* — Morgan, Lewis & Bockius LLP

(57) ABSTRACT

Systems and methods for providing energy management utilize wireless wide-area network broadcast signals and a decentralized receiver architecture to allow customers to make informed choices with regard to energy consumption and load shedding for particular appliances. A receiver assembly embedded within an appliance receives a broadcast signal, e.g., an FM subcarrier signal, including tariff data and other electrical grid data. A processor coupled with the receiver controls the appliance in accordance with the received data and in accordance with user-defined preferences. In some embodiments, a transceiver assembly is embedded in one or more appliances in a household. Each transceiver is configured to receive broadcast signals regarding grid data, and to communicate with other appliances and/or a usage meter over a wireless personal area network. Meter data from one of more households may be aggregated and uplinked back to the energy provider or other entities.

41 Claims, 14 Drawing Sheets

SYSTEMS AND METHODS FOR MODIFYING POWER USAGE

CROSS-REFERENCE TO RELATED APPLICATIONS

This application is a continuation of U.S. application Ser. No. 11/885,928 filed on Sep. 7, 2007, now U.S. Pat. No. 8,183,995, which is a national phase application of PCT Application No. PCT/US2006/008705 filed Mar. 8, 2006, which claims priority to U.S. Application No. 60/659,455, filed on Mar. 8, 2005 and U.S. Patent Application No. 60/679,439, filed May 9, 2005, each of which is hereby incorporated by reference herein in its entirety.

1. FIELD OF INVENTION

The present invention concerns methods of energy management. More particularly, the invention pertains to systems and methods to manage power grid peak energy load on the basis of tariff information originating either directly or indirectly from a utility company or utility related company such as an energy marketer, load distributor, or independent market operator.

2. BACKGROUND OF INVENTION

Energy generation, distribution, and/or consumption systems ("energy-related systems") are complex. Such systems typically involve a multiplicity of energy producers and energy consumers tied together by way of a complex web of energy distribution channels or energy transporters. The complexity of such systems is further increased when one considers that many, if not all, energy producers themselves are complex systems that convert non-electrical energy resources such as fossil fuel, nuclear, wind power, or solar energy resources into, for example, electrical energy, and that require additional resources such as chilled water for their operation. That is, the complexity of energy-related systems is further increased if one considers the scope of such systems to include the relationships between energy producers and upstream energy production enablers that make it possible for those energy producers to operate.

2.1 Peak Demand Periods and Load Shedding

A problem confronting this industry today is the great variance in total energy demand on a network between peak and off-peak times during the day. This is particularly the case in the electrical utility industry. The so-called peak demand periods or load shedding intervals are periods of very high demand on the power generating equipment where load shedding can be necessary to maintain proper service to the network. These occur, for example, during hot summer days occasioned by the widespread simultaneous usage of electric air conditioning devices. Typically the load shedding interval may last many hours and normally occurs during the hottest part of the day such as between the hours of noon and 6:00 p.m. Peaks can also occur during the coldest winter months in areas where the usage of electrical heating equipment is prevalent. In fact, power requirements can vary not only due to variations in the energy needs of energy consumers that are attempting to accomplish intended goals, but also due to environmental regulations and market forces pertaining to the price of electrical energy. In the past, in order to accommodate the very high peak demands, the industry has been forced to spend tremendous amounts of money either in investing in additional power generating capacity and equipment or in buying so-called "peak" power from other utilities which have made such investments.

To meet fluctuating energy demands, energy producers can either individually adjust the energy that they are producing and outputting and/or operate in cooperation with one another to collectively adjust their output energy. However, energy consumption is far from the only operational aspect of energy-related systems that can necessitate rapid, reliable and accurate changes to system operation. Indeed, energy producers often experience fluctuations in terms of their intrinsic abilities to generate and output power of various levels and other characteristics. For example, under certain circumstances it can become necessary for a given energy producer to shut down for testing or maintenance, or to avoid cascading failures. Also, for example, in circumstances where multiple energy producers operate together to generate and output power (e.g., to a common power grid), and to the extent that a given energy producer finds it necessary to adjust its energy output, it can become necessary for others of the energy producers to modify their own energy output to account for the changes in the given energy producer's output. As in the case of energy consumers, environmental regulations and market forces pertaining to the price of electrical energy can impact the operation of energy producers as well.

Additionally, the operation of energy producers often is highly dependent upon the operation of energy production enablers that supply resources to the energy producers allowing those producers to operate. Yet the operation of the energy production enablers also is susceptible to fluctuation for a variety of reasons including, again, environmental regulations and market forces. For example, the availability and/or price of certain raw materials that are supplied by energy production enablers to energy producers, such as oil, coal or natural gas, can vary significantly.

Also, the capabilities of energy transporters to reliably and efficiently transport energy from energy producers to energy consumers can vary for numerous reasons. For example, storms and other weather-related conditions can occasionally disable or disrupt the operation of power lines that are transmitting electrical energy. In some circumstances, the particular arrangement of energy transporters can also necessitate changes in the operation of those energy transporters.

Given these various levels of complexity inherent in the operations of energy-related systems, and given the importance of operating such systems in an efficient and reliable manner, such systems deserve careful control and monitoring. Yet conventional energy-related systems are often limited in this regard, particularly in terms of controlling and coordinating the interdependent operations of different energy consumers, energy producers, energy production enablers and energy transporters. In particular, central control systems for allowing system-wide control of energy-related systems have typically been impractical to implement for several reasons, particularly the difficulty and expense associated with designing control programs for such complicated systems.

Consequently, in conventional implementations, the various components of electrical energy-related systems such as energy consumers, producers, production enablers and transporters are typically controlled and operated independently of one another such that there is no overall control for the system as a whole, and any coordination of the different system components merely occurs in a reactive manner.

In one approach designed to alleviate the aforementioned difficulties, electric utility companies have turned to load shedding as a means of responding to the fluctuating energy demand. This practice has led to the use of the term "load shedding interval" to define the period in which the network load is controlled. It is desirable that a load shedding device limit power demand uniformly over the entire load shedding interval because the actual peak of power demand on the total utility grid could occur at any time during the load shedding interval.

In the known art, several basic strategies and devices have been utilized for load shedding in order to limit the peak power demand on the power generating capacity of electric utility companies. One such mode involves sending signals either over the power lines or by utilizing a radio-type signal emanating from the utility to disconnect or interrupt the use of certain selected electric loads such as air conditioning compressors when the demand has reached a certain point. While this type of direct control of power consumption by the utility achieves usage cutbacks during peak periods that prevent the power network from becoming overloaded, in many cases, the great inconvenience to the user who may find his power disconnected for an inordinately long time may well outweigh the benefits of the load shedding.

An alternate method of control employed by utility companies to reduce peak power consumption on given networks involves the concept of duty cycling. This involves a time sharing over the network of certain amounts of the power during peak periods such that service is interrupted to selected devices on a time sharing basis. Thus, for example, on a ten minute per one-half hour duty cycle, all of the devices for which service is to be interrupt have their service interrupted ten minutes out of each one-half hour on a rotating basis which each ten minutes involving one-third of the device population. While this method of duty cycling does accomplish some load shedding, it has several disadvantages.

First, fixed-period duty cycling tends to destroy "natural diversity." Natural diversity can be illustrated in terms of many machines supplied by a common power network. A large group of air conditioning or heating machines that continually cycle ON and OFF to maintain comfort conditions in corresponding spaces have a natural tendency to operate such that the cycling pattern of each machine is in random phase with the cycling pattern of all other such machines in the power network. In this fashion, there is but a random likelihood that all of the air conditioning compressors or heating machines will be operating at the same instant. The tendency for this random operation is then called natural diversity. Any load shedding strategy that tends to synchronize the running periods of all the compressors or heaters in the utility service network reduces natural diversity. Synchronization causes significant spikes in power demand during the ON cycle of these devices and negates much of the benefits of the load shedding. If the devices to be interrupted are electric air conditioning and cooling units, for example, the chances are that all such units whose power supply has been interrupted will be calling for power at the end of the OFF cycle such that a spike in power demand will occur upon switching of the interrupted units at the end of each cycle.

Also, this method of load shedding may be defeated or overcome by the customer by the installation of an oversized air conditioning or heating unit such that it may maintain the temperature of the environment utilizing only that portion of time allotted to it. The net effect, of course, is that no real power is shed.

The general problems associated with all such load shedding methods and devices is that, while they may accomplish a certain amount of load shedding which benefits the electric utility, they largely ignore a very important factor, the impact of one or more modes of interrupted services on the customer or user. Abrupt or large changes in the environmental temperature of a conditional space are very undesirable from the standpoint of the customer.

Other prior art methods of load shedding include the timed resetting of thermostats to a higher setting in the summer during the air-conditioning season and to a lower set point during the heating season for a specified period or number of hours during the peak demand part of the day. This step change can result in a significant energy savings over a long period, but yields only a relatively small power reduction at the peak load time. Moreover, such a method does not allow users to make informed decisions regarding temperature settings or energy usage based on current energy prices.

2.2 Known Systems for Residential Load Shedding

In addition to general load shedding techniques such as those described above, a number of systems and methods for managing the aforementioned problems associated with fluctuating energy supply and demand have been described in various United States patents and publications. For example, U.S. Pat. No. 4,247,786 to Hedges teaches a datacasting system, including residential load controllers (RLCs), that enforces utility-generated demand limits on residential circuits. However, the datacasting system taught by Hedges is unsatisfactory because utility customers resist utility imposed limits on residential energy usage.

U.S. Pat. No. 4,345,162 to Hammer provides an adjustable thermostat for use in a home or other type of dwelling. The thermostat interrupts and overrides the normal thermostat control in a space conditioning system upon receipt of an external signal, as from a power company, in a manner such that the consumed power does not rise above the level that persisted just prior to the initialization signal. The adjustable thermostat senses the "natural" or thermostat-controlled cycling pattern of a space conditioning system such as an air conditioner just prior to the start of a load shedding interval. The last cycle is then caused to become the reference or control cycle for the load shedding interval. That is, the ON portion of the reference cycle is caused to become the maximum allowable ON interval and the OFF portion of the reference cycle is caused to become the minimum OFF interval for the entire load shedding interval. In this way the average power consumption is maintained at a level equal to or below the initial or pre-load shedding value. While functional, the Hammer system has the drawback that it still requires nonvoluntary cessation of power usage. Furthermore, the Hammer system is only useful for electrical space conditioners and not other power consuming household appliances such as dishwashers, hot water heaters, vacuum cleaners, and the like. Thus, the Hammer system will only provide limited relief to an overtaxed utility grid during periods of peak usage or during emergency situations in which power demand outstrips power supply.

U.S. Pat. No. 4,513,382 to Faulkner discloses a load management terminal for an electric utility automated distribution system that includes a receiver for receiving central commands sent from an electric utility central station by power line carrier signals. A control unit is connected to the receiver for executing the commands such as load shedding and remote metering. The terminal includes means for generating data at the remote site representative of the results of the executed commands and for storing the status data in a memory device. A video signal generator converts the status data into a composite video signal that is supplied to a modulator to produce a standard RF television signal. The terminal is selectively connected to the television receiver of an electric utility customer, whereby the metering and load shed status data is displayed on the customer television receiver. The terminal can also include billing information, such as a change from a peak rate schedule to a shoulder or off-peak rate schedule. As such, in Faulkner, the cost of each kilowatt hour of electrical energy can be changed. However, Faulkner, like Hedges is unsatisfactory at least in part because the utility manages the demand of the customer.

U.S. Pat. No. 6,216,956 to Ehlers describes an indoor environmental condition control and energy management system that accepts input from a user regarding desired climate control and an energy price information. The system then maintains climate control in view of the energy price information and the users specified climate parameters. However, Ehlers teaches inputting energy rate table information through a user interface, a smart card reader or a communications link with a service provider. Ehlers does not disclose any datacast or other ubiquitous or comprehensive transmission means by which tariff data is delivered directly to an appliance controller.

United States Patent publication No. 2005/0034023, published Feb. 10, 2005 to Maturana et al., describes a control system for an energy-related system including an energy consumer and an energy producer. The control system includes a first agent in communication with the energy consumer for the purpose of at least one of controlling and monitoring an operation of the first energy consumer, a second agent in communication with the energy producer for the purpose of at least one of controlling and monitoring an operation of the first energy producer, and a network at least indirectly coupling the first and second agents and allowing for communication therebetween. The first and second agents are capable of negotiating with one another in order to determine an amount of energy to be delivered from the first energy producer to the first energy consumer. A drawback with Maturana is that it is expensive to implement and tends to require mandatory curtailment of energy use by the energy consumer.

As described above, many existing systems force load shedding upon utility customers (e.g., residential and commercial) without regard to the energy usage preferences and/or of such customers or the specific requirements of the appliances used by such customers. Furthermore, such systems are also unsatisfactory due to the liability associated with such forced appliance control. For example, if a freezer controller malfunctions and spoils food, the customer has historically been compensated. Few customers want their energy provider forcing them to live a specific way or changing their appliance operation without their knowledge. Most customers would like to choose what appliances are used and when, and even in full knowledge of a high price for energy may continue to consume. However, if faced with the choice of the power going out, or rolling blackouts, such customers may reduce their consumption if the system is effective.

2.3 LAN-Based Systems for Load Shedding

A number of existing and proposed systems deployed on customers' premises are based on a centralized, local area network (LAN) approach, in which there is typically one receiver and one server per utility customer. The receiver captures remotely transmitted utility information for processing by an on-premise server. The server subsequently controls local sheddable loads interconnected to the server via a local area network. Such systems do provide load shedding at the individual-customer level. However, such systems suffer from a number of shortcomings.

A first drawback with LAN-based systems for load shedding is that their implementation requires the addition of significant on-premise infrastructure. This is because residential and commercial buildings are typically not equipped with the type of local area network wiring suitable for such systems. The cost of installing such systems using dedicated wiring is prohibitive. Such systems can also be installed using wireless local area and personal area networks such as WiFi (IEEE 802.11, hereby incorporated by reference in its entirety), Bluetooth (IEEE 802.15.1, hereby incorporated by reference in its entirety), and Zigbee (IEEE 802.15.4, hereby incorporated by reference in its entirety). However, access point base stations and transceiver clients needed to support such wireless networks tend to be costly and are susceptible to noise and co-channel interference due to their operation in unlicensed frequency bands. Such systems can also be installed using low cost power line based communication systems such as X10 in the United States, X20 in Canada, X30 in Europe, X31 in Spain, X32, in France, and X40 and X41 in Japan as well as CEBUS (EIA-600 standard, hereby incorporated by reference in its entirety). However, such communication systems are subject to inherent reliability problems due to electromagnetic interference (e.g. TRIAC based light dimmers), signal isolation across power line phases, and adjacent and co-channel interference from neighbors who use power line control systems that share the same low voltage transformer. Higher performance systems mitigate some of these problems but with increased cost.

A second shortcoming with LAN-based approaches is reliability. For instance, a failure on the part of the receiver or server can render the entire system inoperable. In some instances, depending on the type of failure, there is a danger that utility customers and the appliances used by such customers could be left in a load shed state until the failure is rectified. This errant load shed state may last minutes, hours, or weeks. In fact, if the affected utility customers are not able to diagnose the problem as a failure in a LAN-based transmitter, the problem may persist for even longer periods of time and lead to considerable inconvenience and hardship.

A third shortcoming with LAN-based approaches is that many appliances are not amenable to load shedding schemes that simply disconnect and reconnect AC power at arbitrary times. Refrigerators, for example must maintain an average temperature over time in order to preserve products requiring cold storage. The duration of an acceptable load shed event, for such a device, would therefore be a function of ambient and internal temperatures, the amount of food stored, the insulative properties of the cabinet, and the frequency and duration of previous load shed events. Load shedding of such an appliance is therefore best left to refrigerator manufacturers. Such manufacturers can develop intelligent compressor load shedding system tailored to the refrigerator and its environment.

Finally, for reasons of safety, liability, and product differentiation, OEM and OED vendors are more apt to embrace a load shedding system that facilitates autonomous operation.

U.S. Pat. No. 4,360,881 to Martinson discloses an energy consumption control system and method for use by a utility company for reducing energy consumption during peak hours of demand. Martinson utilizes an FM radio sub-carrier to send control codes to utility customer control loads. The system has a single wireless receiver with an integral server, a local area interconnect network, and a number of alternating current (AC) disconnect switches, one per appliance, that are interposed between the appliance and the power line. The wireless receiver/server receives FM sub-carrier signals, extracts the payload commands generated by the utility, and signals the AC disconnect switches as appropriate using the local area network. However, this system has drawbacks. It does not facilitate customer intervention to accommodate lifestyle needs, it is susceptible to failure due to its centralized architecture, it employs a costly wired local area network layer, and it only uses external disconnect switches that are not suitable for many load sheddable appliances.

U.S. Pat. Nos. 5,572,438 and 5,696,695 to Ehlers describe a residential power monitoring system that receives power pricing information from a power company and monitors load usage using a plurality of sensors throughout a dwelling. A general purpose computer, such as an IBM compatible personal computer, is present in each residence. The general purpose computer receives input from the plurality of sensors throughout the residence as well as the utility power pricing information. With this information, the computer is able to monitor power consumption. While functional, the system has the disadvantage of being expensive to implement because it requires a networked computer to control and monitor a number of sensors in a residence.

U.S. Pat. No. 5,430,430 to Gilbert teaches a control method for reducing energy consumption during peak hours of demand The customer premise system is comprised of an "Electric Power Manager" (EPM) preferably linked to an electricity meter capable of relaying tariff schedules information to the EPM, and a LAN directly interconnecting appliances capable of establishing two-way communication with the EPM. The EPM functions as a tariff server capable of broadcasting tariffs that are currently in force to appliances as well as answering tariff queries made by appliances. Gilbert permits appliances to make operational decisions based on current tariffs in force. However, Gilbert has the drawback that it uses a centralized EPM server. As such, the system is at risk to complete failure at times when the EPM server is not functional. Furthermore, Gilbert has the drawback of employing a costly two-way local communication network.

In summary, various known systems for residential energy control and load shedding each have one or more of the following disadvantages: being overly complex, expensive, unreliable, inflexible, or ineffective. Given the above background, there remains a need for a cost effective reliable approach to notifying utility customers of current power supply availability and cost, so that informed decisions on power usage can be made.

3. SUMMARY OF INVENTION

The present invention addresses the shortcomings found in the prior art. The present invention provides energy management and load shedding systems that have comprehensive transmitter coverage and a decentralized receiver architecture that allows customers to make informed choices with regard to energy consumption and load shedding for particular appliances.

In some embodiments, the present invention provides an inexpensive home dashboard device. Such devices are so inexpensive that new ones can be purchased when a customer moves to a new energy suppliers' area. The dashboard uses easy to understand symbols to convey information about current power supply and cost. In some embodiments, the dashboard includes text messaging capabilities to convey such information. Energy consumers can use the dashboard to voluntarily modify their energy consumption behavior based on the information provided by the dashboard.

The dashboard features a wireless utility message channel (UMC) service in the form of datacasting. Such datacasting is conveyed from utility companies or energy distributors, for example using a wide-area wireless communication system. Exemplary wide-area wireless communication systems employed within embodiments of the present invention include, but are not limited to: analog cellular (e.g., TIA 464B dual-tone multi-frequency, analog modem), digital cellular such as cellular digital packet data (CDPD), general packet radio services (GPRS), enhanced data rates for GSM evolution (EDGE), Mobitex, two-way paging (e.g., ReFlex), the Ardis network, satellite (e.g., TDM/TDMA X.25 VSAT networks), WiMAX (IEEE 802.16 MAN, hereby incorporated by reference), WiFi (802.11), and networked AM, FM, high definition radio, TV and satellite radio broadcast systems including any subsidiary communications multiplex operation sub-carriers offered by any of the aforementioned systems. Dashboards having an FM radio receiver are particularly cost effective, with a cost in the range of tens of dollars or less. In preferred embodiments, the dashboard has an FM radio receiver that receives datacasting information through the Europe and RDS CENELEC standard and/or the North American RBDS NAB/EIA specification. As such, the home dashboard provides an economical way to get energy market information into consumers' homes without rewiring or electrical modification. RDS and RBDS is described in for example, Kopitz and Marks, 1999, *RDS: The Radio Data System*, Artech House Publishers, Boston Mass., which is hereby incorporated by reference in its entirety.

In other preferred embodiments, the dashboard has an In-Band On-Channel (IBOC) receiver for receiving datacasting information from digital signals that are broadcast as "sideband" transmissions bracketing the top and bottom of a host analog radio signal in order to make optimal usage of the current spectrum allocations. As such, IBOC refers to a method of transmitting a digital radio broadcast signal centered on the same frequency as the AM or FM station's present frequency. For FM stations, the transmission of the digital signal occupies the sidebands above and below the center FM frequency (e.g., 97.9 MHz). AM band transmissions also place the digital signal in sidebands above and below the existing AM carrier frequency. By this means, the AM or FM station digital signal is transmitted in addition to the existing analog signal. One or both of the digital signal sidebands may carry UMC data to an IBOC receiver or transceiver, e.g., a receiver or transceiver embedded within or otherwise associated with an appliance. Additional details regarding IBOC systems may be found, for example, in U.S. patent application Ser. No. 11/053,145, filed Feb. 5, 2005; Johnson, "The Structure and Generation of Robust Waveforms for AM IN-Band On-Channel Digital Broadcasting", iBiquity Digital Corporation, http://www.ibiquity.com/technology/pdf/Waveforms_AM.pdf; and Peyla, "The Structure and Generation of Robust Waveforms for FM IN-Band On-Channel Digital Broadcasting", iBiquity Digital Corporation, http://www.ibiquity.com/technology/pdf/Waveforms_FM.pdf, each of which is hereby incorporated by reference in its entirety. One skilled in the art will appreciate that, while a hybrid IBOC configuration is discussed above (e.g., analog+ digital components), the UMC signals and intercommunication of components of the present invention may be transmitted in an all digital IBOC configuration.

The systems and methods of the present invention for communicating energy management information to consumers are complimentary to new metering technologies that measure residential energy usage in intervals as frequently as every fifteen minutes or less. Such capability is a dramatic improvement over the once per month frequency that utility companies typically read meters and deliver bills to their customers.

Existing competitive approaches focus on tapping into an electrical meter. A very small number of manufacturers provide remote displays, for example, Ampy Automation Ltd. (Peterborough, England) that provide pay as you go metering. Such pay as you go approaches tell the customer how much longer their power will be on, based on prepaid power bills. On the other hand, in the present invention, the inventive dashboard receives and uses real time price information delivery, a scrolling stock ticker style display for example, with a warning like and easy to understand graphical symbols to make customers aware of time when energy use should be minimized. However, in some embodiments, in addition to such voluntary activity, pay as you go pricing can be implemented. In some embodiments, the inventive units are simple as one flashing light with a symbol. One embodiment that is particularly useful for gauging demand response before an electrical meter is changed includes a prominent button (e.g. a big red button) for the home operator to press when they have responded to a power consumption request from a utility. This response can be used by utility companies to gauge the value of changing the meter at that residence so that it has time of use (TOU) and critical peak pricing (CPP) capabilities. In some embodiments, the dashboard includes text messaging and text messages are used to reinforce the operators' power conservation behavior. For example, if a critical peak pricing message is broadcasted to the inventive device, the energy customer can respond to the message by conserving power. In embodiments in which the device monitors total power usage to the dwelling, the user can push a button on the device and get a "thank you" message as well as an estimate of their wattage reduction on the display. Such power conservation information can be stored and used by energy suppliers to determine which of their contract offerings gives the customer the lowest energy price based on the customers response data. Such information can also be used to determine whether it is worth the cost to replace the electrical meter with a newer digital interval meter.

In other embodiments, an end user-depressible button feature, described above, can be used to gauge a consumer's responsiveness to grid management requests. In some embodiments, such responsiveness is gauged by how quickly grid management message requests are acknowledged rather than how quickly power management decisions are executed after management request dissemination. Such acknowledgements can be made in response to a grid management request by instructing the consumer to press the "red button." Of course, the color, size, type and other characteristics of such a "button" can vary without departing from the scope of the present invention. The "red button" of the present invention is any mechanism or device that allows for a utility customer to acknowledge receipt of a grid management message request or alert.

Certain aspects of the present invention appeal to human psychological factors in order to achieve direct association of energy conservation behavior and energy grid needs. For example, in some embodiments, a symbol set for home energy consumption levels as well as energy grid energy status are used. The symbol and the rate at which the symbol is flashed on the novel dashboard indicate the immediacy of any need to change energy consumption levels. For example, the faster the flashing of a light on the dashboard, the more important the need is to conserve energy. Thus, the inventive system features a datacast utility grid information using lights, symbols and text so that energy consumers have an awareness of power grid load at all times. This increases the benefit as grids continue to decentralize their generation resources and include new biomass, wind and solar resources wherever need or interest dictates.

In California there are predictions of 60,000 generating sites by 2010. This number of active small generators can't be actively managed using today's technologies. Forecasting works well for predictable weather situations, but does little when failure of large transmission lines or generation plants occurs. In high grid stress and overload situations during peaks and with failures, the only option available is to reduce the consumption of millions of small users, which takes a communication system able to deliver a message directly at the load itself, at home near appliances and at the office near lights and computers.

The inventive devices can further be used to take advantage of certain alternative energy programs. For example, consider an environment where wind power and/or other sources of renewable energy are provided. In order to have this wind power energy (or other source of renewable energy) used as a resource, incentive schemes can be used. Such incentives can be, for example, in the form of energy contracts for wind energy in which a customer would agree to pay a premium of, for example one or two cents per kWh for all of their consumption, and in turn the utility would contract development of the wind energy resource. However, in conventional systems, people paying such a premium for such wind power would have no idea when wind power is available. Further, because wind power is not available all the times, such consumers would not know if their power was coming from wind turbines or somewhere else. This means that customers can't "vote with their power habits" as to what kind of energy they want to use. They must sign onto whatever programs their energy suppliers offer. The net effect is their consumption patterns don't change, either in the short term or long term. The customers have no information by which choices can be made. They only pay the contract price for power. The inventive devices can be used to provide information about the current availability of such power. As such, consumers can have control over the cost of their energy as well as the source of the energy they use.

Currently consumers have limited price incentive to manage their use of electricity as there is no price differential or way to measure consumption at different time periods. To address this problem, many utility organizations have proposed the use of smart meters that will bill customers for the use of power based on rates that can fluctuate on a daily basis or some other time interval, such as an hourly basis. The problem with such smart meters is that they do not provide a convenient mechanism by which to inform customers of current power rates. The present invention addresses this need by providing such a device. The inventive device can be integrated into major appliance in the home and used as a basis for regulating the times when such devices operate, how frequently they operate, and how much power they consume when they operate. In addition the inventive device can be implemented as a battery operated standalone device that provides rate information in the form of a symbolic light system, an alphanumeric or graphical display (e.g., an LCD display), audible sounds, or other methods of communication.

In other embodiments, a load shedding system according to the present invention has the following characteristics: (i) a decentralized architecture that reduces the chances of complete system level break down arising from the failure of a single system component; (ii) voluntary load shedding; (iii) use of low cost receiver technology that can be readily integrated directly into load shedding amenable appliances; and (iv) use of low cost base station transmitter technology employing a licensed frequency spectrum having comprehensive coverage and with enough transmit diversity to prevent multipath distortion effects. Because of the use of low cost transmitter and receiver technology, such a system has the advantage of not requiring on-premise infrastructure equipment or cabling;

In other embodiments, a decentralized system load sheds appliances in accordance with consumer lifestyle choices. For example, each appliance can have its own integrated RDS/RBDS or IBOC wireless receiver capable of independent receipt of real time utility tariffs, standards-based clock time, and grid status information broadcasted directly from a wide area network (e.g. using a network of FM radio stations that broadcast subsidiary communications multiplex operation sub-carriers). In some embodiments, each such appliance is configured to use such information in an autonomous manner. No local intercommunication among residential appliances is necessary in such embodiments. In some embodiments, a local area network (e.g. Zigbee) is optionally used to facilitate inter-appliance communication. Such communication can be used to provide an aggregate load shedding response that improves overall load shedding performance. However, even in embodiments where inter-appliance communication is possible in order to produce an aggregate load shedding response, each appliance is capable of independent load-shedding decisions when the local area network is not present or otherwise functioning improperly. This feature is advantageous because it prevents the failure of any one component of the system from causing the entire system to fail.

In some embodiments, each appliance is user programmable and is capable of storing user configuration data (e.g., using non-volatile memory). Programmable features in such appliances include the ability to determine how power tariff and grid status information is to be used. In the case of a thermostat regulated appliance, for example, temperature set points are programmable to meet consumer oriented goals (e.g., personal comfort, etc.) as opposed to power provider based goals.

In optional embodiments, when there is a contractual agreement in place between the utility provider and the utility consumer, load shedding at the appliance level can be placed directly under control of the utility provider during well-defined power grid conditions (e.g. impending rolling blackouts) as specified by the contract.

In a preferred embodiment, an energy management system includes a series of IBOC or FM sub-carrier RDS/RBDS radio transmitters each interconnected to a corresponding on-site utilities message server that is also connected to the Internet and operable to extract tariff and time reference information from remote servers connected to the Internet. Radio receivers directly embedded within appliances are operable to receive such IBOC or RDS/RBDS modulated tariff data. Load shedding is then performed based on consumer programming and power tariff rates in force. In some embodiments, a man machine interface (MMI) operable to accept user program input controls the appliance's load shed characteristics commensurate with tariff rates in force. In optional embodiments, appliances are equipped with a user activated override feature that permits the bypass of load shed operation.

Once skilled in the art will appreciate that while the systems and methods of the present invention are described herein in detail with regard to particular appliances, e.g., a heating ventilation and air conditioning (HVAC) thermostat, numerous other particular embodiments are possible and intended to be within the scope of the invention.

In another aspect of the invention, a household appliance or other electrical apparatus comprises a transceiver and a microprocessor in communication with the transceiver. The transceiver comprises a receiver for receiving signals and a transmitter for transmitting signals. The microprocessor comprises instructions for receiving, via the receiver, broadcasted radio signals that include electrical grid data; and instructions for communication, via the transmitter, information about an electrical load of the household electrical apparatus. The electrical grid data may be, for example, a grid status, an energy tariff, or customer relationship management data. In preferred embodiments, the receiver is a RDS/RBDS or IBOC receiver capable of receiving signals transmitted from a RDS/RBDS or IBOC transmitter. In some embodiments, the transceiver and the microprocessor are in a single package to facilitate sharing of common hardware components.

In one aspect, a transceiver embedded in a household appliance facilitates Time Division Duplex (TDD) of an air medium to effect half duplex communication on a common sub-carrier frequency. In some embodiments, the transceiver facilitates time division multiplexing of an air medium to effect half duplex intercommunication between three or more transceivers on a common sub-carrier frequency. In some embodiments, the transceiver employs Carrier Sense Multiple Access with Collision Avoidance (CSMA/CA) to effect time division multiplexing of the air medium. In some embodiments, the transceiver facilitates Frequency Division Multiplexing (FDM) of the air medium to effect half duplex intercommunication between three or more transceivers on different sub-carrier frequencies. In some embodiments, the transceiver facilitates a Zigbee Protocol Stack.

In another aspect, an uplink backhaul apparatus comprises a transceiver including a receiver for receiving household electrical load data from a plurality of nodes over a wireless connection; and a transmitter for transmitting pooled household electrical load data from said plurality of nodes. The wireless connection may a connection to a personal area network or a local area network, e.g., for communicating electrical load data between nodes and appliances with nodes. In some embodiments, the transmitter transmits the household electrical load data over the Internet, a PSTN network, a paging network, a satellite communication network, a cellular phone network, an RDS radio signal, an IBOC radio signal.

4. BRIEF DESCRIPTION OF THE FIGURES

Like reference numerals refer to corresponding parts throughout the several views of the drawings.

5. DETAILED DESCRIPTION OF THE INVENTION

The present invention provides a novel display for use in a dwelling to obtain information about an energy-related system. This information is used to voluntarily initiation power consumption programs during times of need, thereby alleviating the need for more drastic measures such as rolling blackouts.

5.1 Exemplary Energy-Related System

Figure 1:
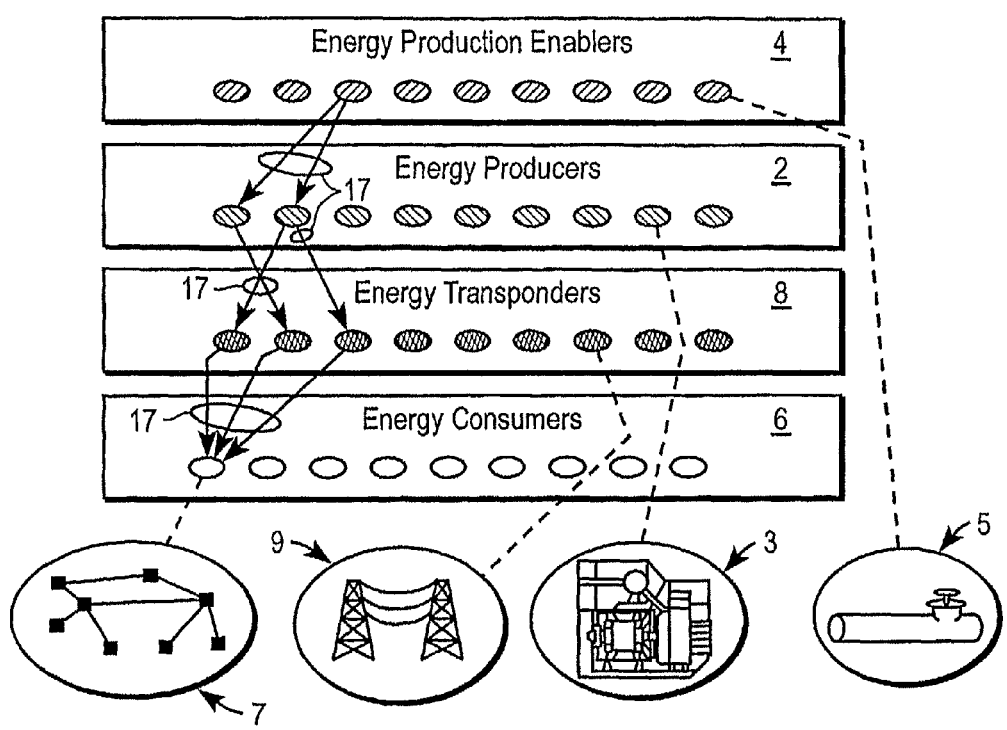
FIG. 1 illustrates an energy-related system in which the displays of the present invention have application.

Referring to FIG. 1, an electrical energy generation, distribution, routing, storing and/or consumption system ("energy-related system") 1 can be thought of as including four types of components. First, there are one or more energy producers 2 that are capable of producing electrical power. The energy producers 2 can include, for example, a generator set (or "genset") 3 formed by an electric generator/alternator that is driven by internal combustion engines as shown in FIG. 1. Also, the energy producers 2 can include, for example, generators driven by a variety of other driving mechanisms such as steam turbines, coal, water flow or wind, as well as alternate electricity-producing devices such as nuclear generators, fuel cells, or solar cells or energy harvesting devices (e.g. windmills, piezo-generators, photo-voltaic farms, etc.) or aerobic and anaerobic digesters such as can be coupled to power generators. Often, the energy producers 2 depend upon one or more additional components to produce the electrical energy, which can be termed energy production enablers 4. The energy production enablers 4 can include any of a variety of components or other systems that enable the energy producers 2 to produce electrical energy, for example, a piping system 5 for delivering combustible natural gas or other fuel to the genset 3 as shown in FIG. 1. Other exemplary energy production enablers 4 can include, for example, systems for producing steam to be used by steam turbines such as coal-heated boiler systems and nuclear reactor systems, or hydrogen generators or reformers for fuel cells, or systems for controlling water flow, wind, or solar energy that is provided to the energy producers 2.

Electrical energy that is produced by the energy producers 2 is in turn distributed to one or more energy consumers 6 by way of one or more energy transporters 8. As shown, any given energy consumer 6 can be made up of a plurality of energy consumer subcomponents 7, albeit any given energy consumer can also simply be a single component that requires electricity. The energy consumers 6 are representative of any device(s) that can require electrical power, including, for example, machinery at manufacturing plants and other commercial loads, consumer appliances and other residential loads, refueling sites for electric vehicles, and a variety of other loads. The energy transporters 8 are representative of any intermediary device(s) that are employed to communicate or control the flow of power from one or more of the energy producers 2 to one or more of the energy consumers 6 including, for example, high and/or low voltage power distribution lines 9 and related devices such as switching circuits/circuit breakers and transformers.

FIG. 1 shows, by way of a plurality of arrows 17, generally the flow of energy and energy-carrying materials (as well as possibly other substances) among the energy producers, production enablers, consumers and transporters 2, 4, 6 and 8. Namely, the energy production enablers 4 supply energy and materials to the energy producers 2 that are required for the energy producers to generate electrical energy, the energy producers 2 in turn provide electrical energy to the energy transporters 8, and the energy transporters in turn communicate electrical energy to the energy consumers 6. Although not shown, in some circumstances, the flow of energy, materials and/or other substances can also flow in other directions among the energy producers, production enablers, consumers and transporters 2, 4, 6, and 8. For example, in some cases, one or more of the energy transporters 8 can supply energy to one or more of the energy production enablers 4 to keep those components operating, or one or more of the energy consumers 6 might supply energy to the energy producers 2 in cases where those energy consumers switch from an energy consumption mode to an energy generation mode (e.g., where the energy consumers are capable of switching between operation as a motor and as a generator, switching between the charging and discharging of a capacitor bank, or switching between the charging and discharging of a fuel cell for local and distributed energy storage and supply).

FIG. 1 is intended to provide, in a schematic form, a generic representation of components of a generalized electrical energy-related system. Although examples of the energy producers 2, production enablers 4, consumers 6 and transporters 8 are discussed above and shown in FIG. 1, the present invention is intended to apply generally to any given energy-related system having any combination of one or more energy producers, one or more energy production enablers, one or more energy consumers and/or one or more energy transporters. Additionally, the present invention is intended to apply generally to other types of energy-related systems as well that include one or more energy producers, production enablers, consumers and/or transporters, for example, a hydraulic energy-related system, a heat-based energy-related system and other possible energy-related (or power-related) systems. Further, the present invention is intended to be applicable to energy-related systems of a variety of scopes, such as an international power system, a regional power grid, a subdivision or plant system, and even to systems that are similar to or related to energy-related systems, such as a water distribution system.

Typically, an energy-related system will have at least one energy producer 2, at least one energy consumer 6, and at least one energy transporter 8, if not also at least one energy production enabler 4. Nevertheless, the present invention is still intended to be applicable to energy-related systems that lack some of these components. For example, energy transporters might not be required in systems in which the producers are directly coupled to the consumers. Also, in some systems, it would not be necessary to consider the impact of energy production enablers (e.g., where a water-flow driven generator is driven by an uncontrolled water flow source such as a river). Further, while the energy producers 2, production enablers 4, consumers 6 and transporters 8 can be representative of overall devices that produce, support the production of, consume and/or transport energy, they also can be representative of subcomponents of such devices including, for example, actuatable machines, sensors, communication devices, and input/output devices, as well as groupings of such devices.

Additionally, whether a given device is properly included as (or as part of) an energy producer 2, production enabler 4, consumer 6 or transporter 8 is to some extent an arbitrary determination. For example, a step-down voltage transformer near or at a residence might be considered to be an energy transporter (or a subcomponent of an energy transporter) or alternately as an energy consumer (or a subcomponent thereof). Indeed, an entire network of distribution lines and energy consumers interconnected by those lines could be viewed together as constituting a higher-level energy consumer rather than as an assemblage of energy transporters and energy consumers. Further, in some circumstances a given device can operate as more than one type of component. For example, a device could at different times operate as a motor and as a generator and thus constitute both an energy producer and an energy consumer. Consequently, the energy-related system 1 of FIG. 1 is intended to be generally representative of any energy generation, distribution and/or consumption system having one or more of any of a variety of different types of energy producers, energy production enablers, energy consumers and energy transporters.

5.2 Exemplary Device

Figure 2:
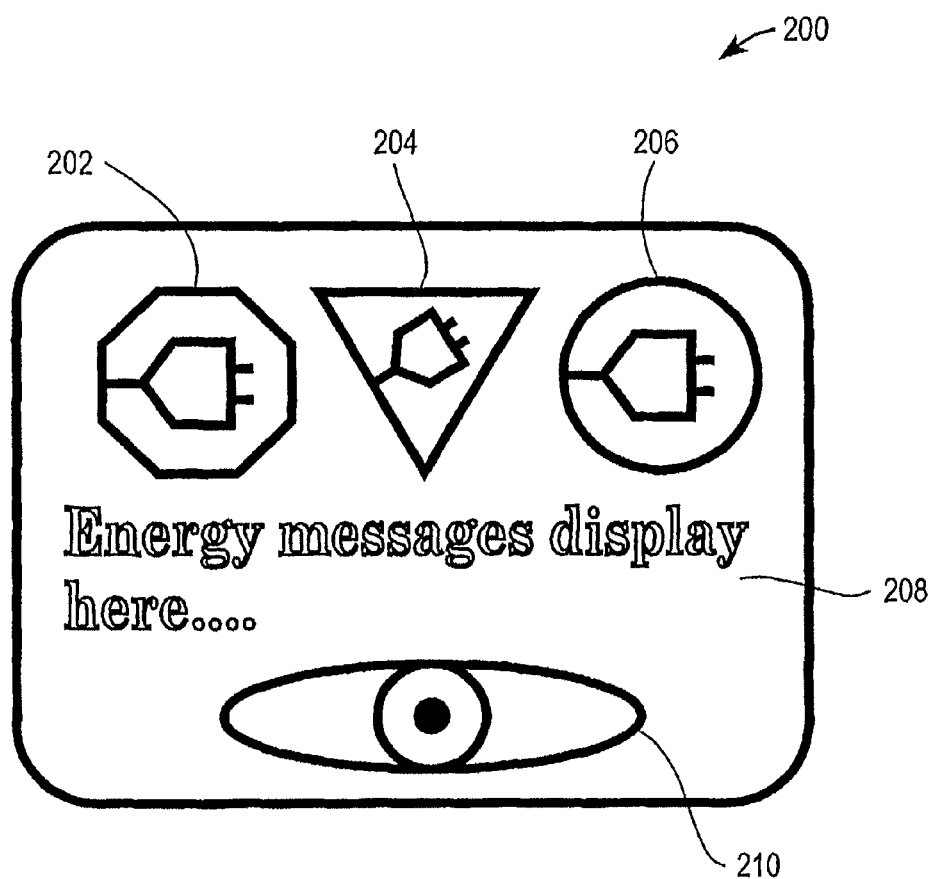
FIG. 2 illustrates a display in accordance with various embodiments of the present invention.

Reference will now be made to FIG. 2, which shows an exemplary display 200 in accordance with an embodiment of the present invention. One skilled in the art will appreciate that, while the following examples are described as employing RDS/RBDS broadcast signals and receivers, IBOC or other transmission systems may be used.

In typical embodiments, display 200 is a battery operated RDS or subsidiary communications authorization (SCA) radio receiver that includes a minimal number of symbols (e.g., symbols 202 through 206), an optional text message output 208, and an optional compliance button 210. In one embodiment in accordance with FIG. 2, symbol 202 is lit when the power grid is experiencing overloaded conditions. In some embodiments, symbol 202 is a red filter and, accordingly, symbol 202 lights up in red when activated. In some embodiments, symbol 202 will flash with an intensity that is proportional to a function of the extent to which the power grid is overloaded. Symbol 204 represents a cautionary symbol that is lit in cases where the power grid is not yet overloaded but is in danger of becoming overloaded. In typical embodiments, symbol 204 is a yellow filter and, therefore, the symbol lights up in yellow when activated. Symbol 206 represents an "all clear" symbol that is lit in cases where the power grid is well within capacity. In typical embodiments, symbol 206 is a green filter and, therefore, lights up in green when activated. Thus, in the dashboard illustrated in FIG. 2, light 202, 204, or 206 is lit at any given time.

In some embodiments, symbols 202 through 206 do not represent the overall power grid. For example, in some embodiments, they represent the availability of a particular energy source such as solar power or wind energy. So for example, in such an embodiment, symbol 202 is lit when the energy source is not available, symbol 204 is lit when the energy source is only partially available, and symbol 206 is lit when the energy source is fully available. In this way, display 200 can enable a utility customer to effectively participate in an alternative energy program.

Text display 208 is used to display messages to the utility customer. For instance, the text messages can be used to relay power rate information, details on a particular power emergency (e.g., the degree to which the grid is overloaded), progress in restoring power after a storm or other forms of power outage information, or scheduled power outage information. In some embodiments, display 208 is an 8 to 16 character alphanumeric display. In other embodiments, display 208 supports between 8 and 100 characters. In still other embodiments, display 208 is a graphical display.

Display 200 is typically battery operated and can be placed anywhere in a dwelling. For instance, in some embodiments, display 200 can be mounted on a wall in the same manner as a central air thermostat. An advantage of display 200 is that no hard wiring is required. All information used by display 200 is relayed to the display by radio waves, such as RBDS, RDS, or SCA radio waves. As such, display 200 can be placed anywhere in a dwelling that has suitable radio reception. For instance display 200 can be placed on a table, a window sill, a night stand, on a shelf, or as mentioned above, mounted on a wall.

In some embodiments, optional button 210 is pressed by a user when they have complied with an emergency request to reduce power consumption. In response, display 200 stores the response and, in some instances displays a thank you message on display 208. In some embodiments display 200 is wired such that it knows the current power usage rate in the home. Thus, in some embodiments, display 200 can track how responsive a utility customer is to emergency power situations. For example, in one such embodiment, when a user presses button 210, display 200 computes the reduction in current power usage from a time before the user reduced power consumption and a time after the user reduced power consumption. Available power rate information is then used to convert this power reduction into a net savings in power consumption. Typically such savings in power consumption is expressed on display 208 as either a total net saving or as a net savings over a unit of time (e.g., net savings per hour, net savings per day, etc.). Alternatively, rather than displaying a net savings, display 208 displays the current utility consumption cost per unit of time (e.g., minute, hour, day, month, year, etc.). In this way, a user can monitor display 200 in order to see the effectiveness of power consumption efforts underway in the dwelling.

In another embodiment, button 210 is used as a demand response receiver. In such embodiments, when a utility wishes provide for demand response (DR) energy reductions based on a DR from their consumer customers, such customers are signaled via UMC datacast to display 200. Display 200 flashes the appropriate symbol (e.g., symbol 202) and delivers a text message instruction for the consumer customer to follow (e.g., turn off unused lights and push button 210). When the customer sees light 202 and responds by pushbutton 210 and turning off lights, then the consumer is prompted to identify how much power they turned off (e.g., 100, 200 watts), and that information is logged in by display 200 for later analysis by the energy provider in order to determine if it is worthwhile to invest in an interval meter for that customer.

In other embodiments button feature 210 can be used to gauge a consumer's commitment or interest to responding to grid management request. In some embodiments, such commitment is inferred by how fast and how often the consumer acknowledges grid management message requests. In such embodiments, the speed at which a consumer makes a measurable load shedding decision is not considered. Thus, for example, what is sought are consumers that acknowledge grid management requests on a frequent basis soon after such requests are transmitted, regardless of whether the consumer actually makes any measurable load shedding response to such messages. In some embodiments, such acknowledgement is made by instructing the consumer to press button 210. An energy provider or other entity can use such a system to obtain information such as (a) whether a message is acknowledged, possibly within a certain expiry period after which the message is no longer displayed to the consumer, and/or (b) the consumer's acknowledge response time, or latency. In other embodiments, a grid management request is sent to a consumer that must be acted on within a predefined time period. In such a case, what is measured is how quickly a consumer presses button 210 relative to the event time forecast. In some embodiments, to gauge a given consumer's compliance threshold, test messages are sent. The time intervals (frequency) such test messages are sent as well as the trial duration over which such messages are sent is varied.

5.3 RDS and SCA Signal Algorithms

As noted in the preceding section, in some embodiments, electrical utility information is received by display 200 using an RDS, RBDS, or SCA receiver that is built into the display. Canada has a service similar to SCA, referred to as SCMO. As used herein, all reference to SCA service refers interchangeably to SCMO as well as SCA service. As used herein, an RDS signal refers to any signal that adheres to any RDS and/or any RBDS specification. In typical embodiments, display 200 is an RBDS receiver that does not require an amplifier or speaker because only a data portion of the RDS signal is monitored by display 200. The RDS signal is carried by an FM broadcast signal.

In an FM broadcast signal, there is the "main" carrier, for example 100.1 MHz which, by itself, contains no information. The main station information to be transmitted, for example a musical song, is then frequency modulated onto the main carrier. This can be monaural (mono) or stereo. If stereo is to be transmitted, then the stereo signal is modulated onto the main carrier using a subcarrier modulation scheme. The RDS signal is modulated onto the main carrier using one such subcarrier. Standard FM receivers detect the stereo channels. To receive the RDS information a special receiver that includes a demodulator is required. In addition to RDS, there exist subsidiary communications authorization (SCA) channels. In some embodiments of the present invention, rather than using RDS, one of the SCA channels is used to convey utility rate information and utility grid load information.

The SCA subcarriers include 67 kHz and 92 kHz although there are no restrictions on the subcarriers frequency other than technical limit or interference considerations. To receive these SCA channels, an FM receiver with a wideband IF and wideband audio output is required in order to pass these subcarriers to the subcarrier demodulator circuit.

There are several types of subcarrier demodulator circuits, any of which can be found in a display 200 of the present invention. A phase locked loop (PLL) circuit "locks" onto the subcarrier and the information FM modulated onto the subcarrier is demodulated as the "error" signal from the PLL. An input filter is provided to pass only the subcarrier and modulation of interest. Another type of demodulator accepts the subcarrier and mixes the subcarrier with a local oscillator generating an intermediate frequency, higher than the subcarrier, which is then amplified and applied to a discriminator circuit. The discriminator circuit output will be the information modulated onto the subcarrier. In some instances, the SCA subcarriers are limited as to the allowed deviation of the main carrier. The limitation is ten percent (+/−7.5 kHz).

Radio data service (RDS), is used by a significant percentage of the FM stations in North America. This data service is a slow speed data that is used to identify the station, the artists name, song title, or promotional information. It uses a subcarrier at 57 kHz and is normally injected at +/−2.5 kHz, but could be the entire subcarrier allowed deviation. In addition to the data used by the station itself, there are numerous other data frames that can be used for such applications as paging, global positioning refinement data, and wide area local control.

Figure 3:
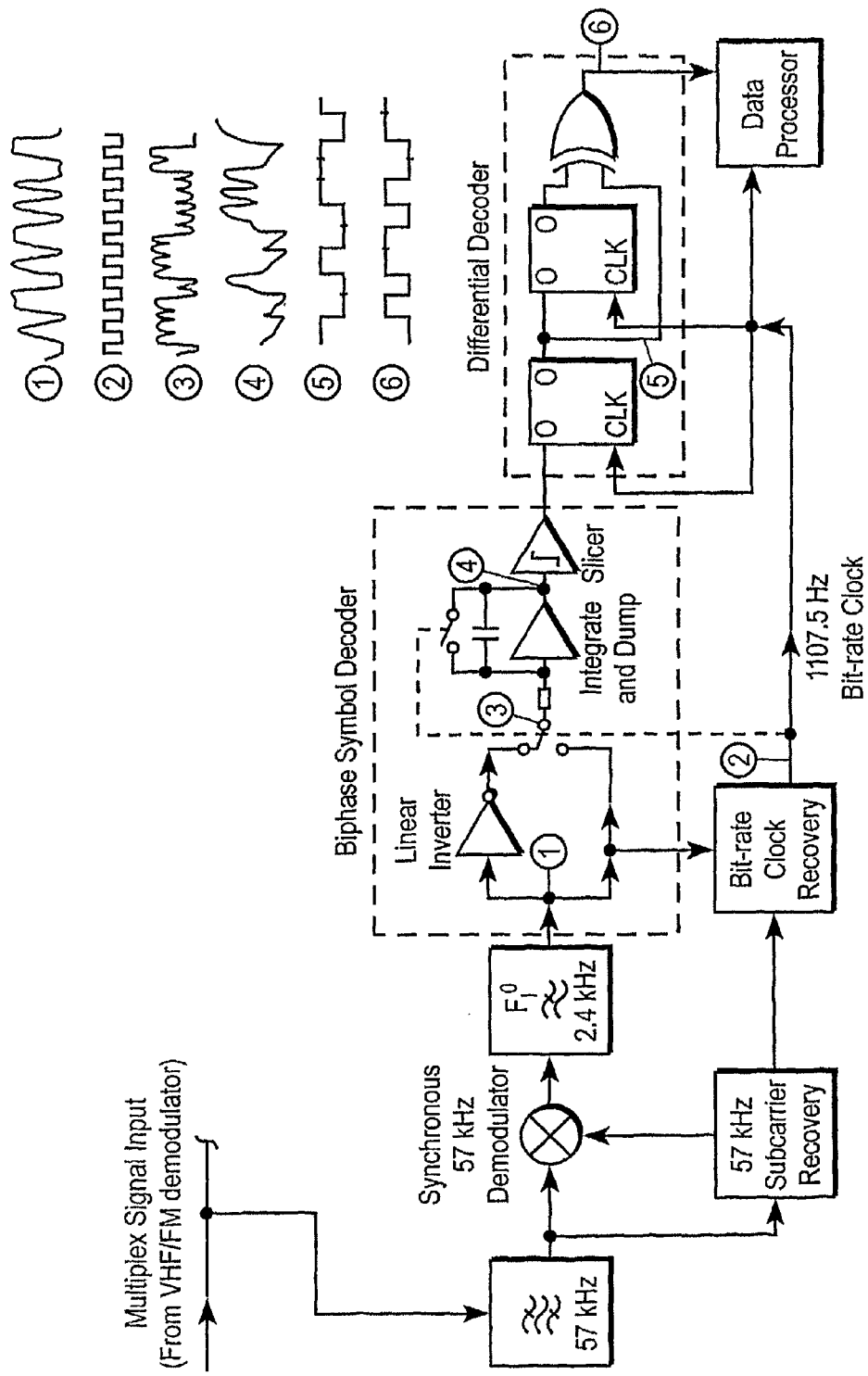
FIG. 3 illustrates a radio receiver present in a display in accordance with various embodiments of the present invention.

FIG. 3 illustrates a block diagram of a typical radio-data receiver/decoder found in display 200. Ordinarily, the multiplex signal input from the VHF/FM demodulator is fed into a stereo decoder with de-emphasis which provides the left and right sound program signals. However, in typical embodiments, display 200 does not provide such a stereo services. Thus, in typical embodiments, display 200 does not have a stereo decoder. The block diagram illustrated in FIG. 3 describes circuitry that can be used to decode the RDS radio signal in order to obtain utility information for use by display 200. The block diagram in FIG. 3 assumes that the RDS signal is carried on 57 kHz subcarrier. However, the present invention is not so limited. Rather than implementing 57 kHz recovery in order to obtain the RDS signals, a 67 kHz or 92 kHz recovery can be used to obtain data from the SCA channels. Furthermore, as different frequency SCA channels are developed, the present invention can be used to recover utility information from such channels as well.

In 1998, the National Radio Systems Committee approved a revised edition of the United States Radio Broadcast Data System (RBDS) Standard. The National Radio Systems Committee (NRSC) is jointly sponsored by the National Association of Broadcasters (NAB) and the Consumer Electronics Association (CEA). Its purpose is to study and make recommendations for technical standards that relate to radio broadcasting and the reception of radio broadcast signals.

The RDS signal is a low bit rate data stream transmitted on the 57 kHz subcarrier of an FM radio signal. Its data rate is 1,187.5 bits per second—though ten out of every twenty-six bits transmitted are error correction codes used to combat signal distortions that occur in the transmission path. Consequently, there is only about 730 bits per second of usable data in an RDS signal.

Figure 4:
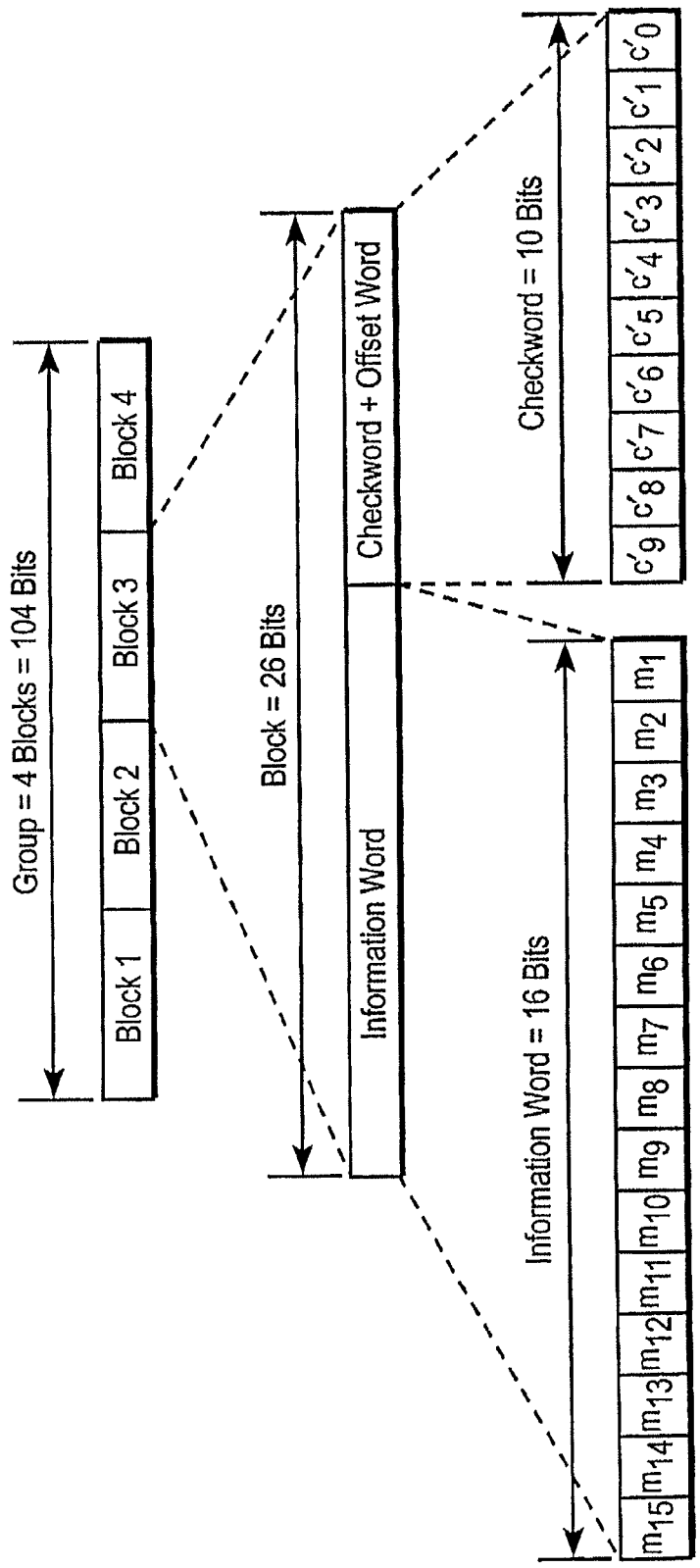
FIG. 4 illustrates the block structure of an RDS subcarrier signal in accordance with the prior art.

The data in the RDS signal is transmitted in 104-bit groups, each of which consists of four 26-bit blocks. Because 10 of the 26 bits in each block are used for error correction coding, there are 16 bits of information in each block. The type of information included in each block is dependent on the group type. There are 32 different group types (0A, 0B, 1A . . . 15A and 15B). Certain types of information, such as the Program Identification (PI) code used to identify the transmitting station, are transmitted in every group type. FIG. 4 illustrates.

RDS has an ability to permit RDS radios to display call letters and search for stations based on their programming format. Special traffic announcements can be transmitted to RDS radios, as well as emergency alerts. The United States RBDS standard is based largely on the European RDS standard. The European RDS standard has been published by the European Committee for Electrotechnical Standardization (CENELEC) in 1998.

The U.S. RBDS Standard includes an "open data application" feature. This feature enables proprietary (or non-proprietary) communications systems to be implemented via the RDS data stream. The data in these systems is transmitted in one or more of the blocks in the RDS data stream. A special code, called the Application Identification (AID) Code is transmitted in Group Type 0A to identify the particular application being transmitted. Each different open data application has its own AID code.

In some embodiments of the present invention, display 200 is adapted to receive information having a specific predetermined AID code. Such codes are assigned by the National Radio Systems Committee and the European Broadcasting Union. AID codes that are assigned by the NRSC in the United States can also be used in Europe, and codes that are assigned by the European Broadcasting Union in Europe can also be used in the United States. More information on RDBS can be found in The National Radio Systems Subcommittee, *United States RBDS Standard*, Apr. 9, 1998, Specification of the radio broadcast data system (RBDS), 2500 Wilson Boulevard, Arlington, Va., which is hereby incorporated by reference in its entirety.

5.4 Geographic Specific Data Delivery

A novel display for providing utility information has been described. In typical embodiments such information is provided using a specialized FM radio receiver that demodulates an FM subcarrier channel in order to obtain the data. Such data is broadcasted using a conventional FM station equipped to deliver such a subcarrier. An FM station can broadcast such data over a large geographic region. In some instances, however, it is desirable to broadcast data to only a subset of the region that is served by a given FM broadcasting station. For instance, in some embodiments, it is desirable to contact utility customers on a specific feeder, or a specific substation. To address such a need, some embodiments of display 200 include a key that represents the geographic position of the display. This key can be coded into display 200 in many different ways. For example, when the unit is purchased, the geographic location of the dwelling where the display 200 will be located can be programmed into the display. This geographic location can be in the form of global position system coordinates. Alternatively, the radio receiver in the display 200 can be used to scan the FM frequency spectrum in order to determine its location using patent pending technology described in Wang et al., U.S. patent application Ser. No. 11/011,222, entitled "Systems and Methods for Geographic Positioning Using Radio Spectrum Signatures," filed Dec. 13, 2004, hereinafter Wang et al., which is hereby incorporated by reference in its entirety. In such embodiments, the radio receiver in display 200 could be a radio signal decoder such as the Microtune MT1390 FM module (Plano, Tex.). The MT1390 is an audio and data FM reception tuner that can scan all available frequencies and allow for continuous reception of data from subcarriers such as Radio Data System (RDS). As The MT1390 chip can be electronically tuned to any given frequency in the FM band through instructions sent to the chip by a microprocessor through an I2C port. The MT1390 chip reports signal strength at the FM frequency to which it is tuned. The MT1380 chip is designed to scan all available frequencies to allow for continuous reception of data from information systems such as Radio Data System (RDS).

As described in Wang et al., the radio signal decoder scans the FM frequency spectrum and/or the AM frequency spectrum in order to measure a radio signature. In embodiments where the algorithms disclosed in Wang et al., are used to identify the geographical location of display 200, the display includes a memory and a microprocessor. The memory can be random access memory (RAM). All or a portion of this RAM can be on board, for example, an FPGA or ASIC. In some embodiments, the RAM is external to the microprocessor. Alternatively, the memory is SDRAM, DDR-SDRAM and/or RDRAM available to a digital signal processor (DSP) or a FPGA that has an embedded memory controller. In some embodiments, the memory is some combination of on-board RAM and external RAM. In some embodiments the memory includes a read only memory (ROM) component and a RAM component. Such memory includes software modules and data structures that are used by the microprocessor to implement the method of Wang et al. Such software modules are described in Wang et al.

Regardless of what method is used to code display 200 with the geographical position or other relative position within an energy-related system described in Section 5.1, such information is used to parse the information received on the subcarrier channel received by the display and to only use and display the utility information that is intended for dwellings in the geographical region in which the display 200 is situated. In some embodiments, the geographical position of the display 200 acts as a key to decrypt the subcarrier data. Failure of the key to decrypt the subcarrier data means that the data was not intended to the geographic region in which the display 200 is situated.

The aforementioned functionality can be used in a blackout situation. For example, blackout information can be coded, for example by geography, and information related to estimated time to restore power to the customers corresponding to that code can be delivered. In some embodiments, the granularity of such information can be varied as desired, e.g., house to house, or by collection of houses, street, block, neighborhood, town, city, county, etc.

5.5 Encryption

In some embodiments of the present invention, information that is broadcasted to displays 200 is encrypted. In such embodiments, display 200 decrypts such messages. The advantage of such encryption is that it ensures privacy of messages provided by the utility company and it prevents hacking of the system. Suitable encryption algorithms are disclosed in, for example, Schneier, *Applied Cryptography. Protocols, Algorithms, and Source Code in C*, Second Edition, 1996, John Wiley & Sons, Inc.; Ferguson and Schneier, *Practical Cryptography*, 2003, Wiley Publishing Inc., Indianapolis, Ind.; Hershey, *Cryptography Demystified*, 2003, The McGraw-Hill Companies, Inc; Held & Held, *Learn Encryption Techniques with BASIC and C++*, 1999, Wordware Publishing, Inc., Plan Tex.; Singh, *The Code Book: The Science and Secrecy from Ancient Egypt to Quantum Cryptography*, 1999, Random House, Inc., New York; Mao, *Modern Cryptography: Theory and Practice*, HP Invent, Palo Alto, Calif.; Menezes et al., *Handbook of Applied Cryptography*, 1996, CRC Press; Kaufman et al., *Network Security Private Communication in a Public World*, 1995, Prentice-Hall, Inc., Upper Saddle River, N.J.; and Binstock and Rex, *Practical*

*Algorithms for Programmers,* 1995, Chapter 3, Addison-Wesley, Reading, Mass., each of which is hereby incorporated by reference in its entirety. Suitable encryption techniques include, but are not limited to, public key encryption, secret key encryption, hash functions, the use of digital signatures, and/or the use of digital certificates.

5.6 Exemplary Data Formats

Embodiments of the present invention in which geographically specific utility data is broadcasted to displays 200 have been provided. In some embodiments, such data is encoded with a 16-bit address. Such an addressing scheme allows the FM broadcast region of a given FM station to parceled into up to 65,000 different zones. Each zone can have a granularity in the energy-related system down to the feeder resolution. That is, a zone can be as small as all the dwellings connected to a given feeder. Only the displays 200 that have a 16 bit key that matches the key in the broadcast message process the utility information displayed with the key. In some embodiments, smaller sized keys are used. However, in such embodiments, techniques such as time slots can be used to increase the number zones that a given broadcast region can be divided into. In such embodiments, each display 200 is assigned a key and a particular time slot. Only those utility messages broadcast during a permissible time slot with the correct key are processed by displays 200.

In some embodiments, control signal to turn on lights 202, 204, and 206 is coded as two bit value, where one of the four possible states of the two bit value is not used or, alternatively, is used to indicate a slowly blinking light 202 versus a rapidly blinking light 202.

5.7 Using Multiple Subcarriers to Transmit and Receive Utility Data

In practice, the displays 200 of the present invention receive utility information from many different sources within the energy-related system. Typically, such information is uploaded to any of a number of FM stations that provide subcarrier services (e.g., RDS or IBOC services). The uploaded messages are then broadcasted over the subcarrier services. The utility messages that are broadcasted are not all alike. They range anywhere from emergency information pertaining to an impending or current blackout to routine noncritical advertisements or rate information. Because of the wide range of types of messages and the number of different utility providers that may want to transmit such information, it is possible for a given subcarrier service to become overloaded in terms of the amount of data that is must transmit. To address this problem, one embodiment of the present invention provides an expected or minimum Quality of Service (QOS) each such utility message requires. This QOS can be defined any number of ways, including but not limited to latency, throughput, jitter, and reliability. This minimum expected QOS information contained within the uploaded data for subcarrier transmission can be used by a subcarrier to prioritize the uploaded data for transmission.

In some embodiments, there is a negotiation sequence in which a utility provider will query a subcarrier service in order to determine QOS conditions. If such conditions at a given subcarrier service do not meet the minimum QOS requirements, then the utility provider can poll other subcarrier services for their present QOS conditions until a satisfactory subcarrier is found. In this way, QOS information can be used as a basis to select the subcarrier broadcasting station or plurality of subcarrier broadcasting stations that are used to broadcast any given utility data. Messages that are more urgent will have a higher minimum QOS and will be broadcasted on a subcarrier at a higher priority and/or on subcarriers that, in general, have been determined to be more reliable and/or have less of a load during the relevant broadcasting time periods.

In general each "real time" utility information dissemination application can have different QOS requirements. Some applications, in fact, may be able to dynamically adapt to channel congestion, for example, in the manner described in the preceding paragraph. In some embodiments, "real time" logical channels) within the RDS/RBDS system are defined. Such a definition permits predictable (e.g. expected value with bounded uncertainty) QOS performance in delivering messages to a display 200. On the subcarrier transmitter side, messages are routed according to QOS attributes. In some embodiments, the subcarrier message server (e.g., RDS message server) has different queues with different priorities, and therefore different effective QOS.

In some embodiments, the utility messages to be transmitted over subcarrier services have expiration times. Such expiration times detail the date and/or time by which the corresponding messages should be terminated. In some embodiments, such messages further include instructions on what to do in the event the message has not been transmitted on the subcarrier prior to the expiration date of the message. In some embodiments, the subcarrier message server has a protocol in place to communicate back to the message source (e.g., a utility company) in order to report on expired messages, actual message delivery time, QOS, etc.

As described above, some embodiments of the present invention provide a system to coordinate transmissions across more than one sub-carrier frequency while respecting QOS attributes. In some embodiments subcarrier servicing of such utility messages coexists with native radio station traffic. This can be accomplished using the subcarrier of a given FM broadcast station by time slicing the subcarrier channel into two or more classes of time segments. Once class of time segments service traditional radio services (e.g. native radio station traffic) while the other class of time segments service utility message applications. The utility message time slice assignments can be coordinated in time so that in servicing a geographic region the transmissions between two or more subsets of transmitters do not overlap. In this manner, a receiver of a display 200 can hop to different subcarriers in a defined manner to increase the "real time" logical channel bandwidth. The utility message time slice assignments can also be coordinated in time so that the transmissions within each transmitter subset transmit within the same time to mitigate coverage problems due to multipath, shadowing etc.

In embodiments where multiple subcarriers are used, the subcarrier receiver of display 200 needs to have the capability of polling more than one FM frequency in order to receive signals from each of the multiple subcarriers. In some embodiments this is implemented by giving the subcarrier receiver in display 200 advance notice as to which frequency it should use to receive utility information. In one implementation of such an embodiment, an expiration date is assigned to ODA group 3A AID channel assignments. The receiver is then given a minimum advance notice when (or if) the AID is to be assigned to different a Group Type. In another implementation of such an embodiment, display 200 has a multi-carrier receiver architecture such that the receiver can listen to more than one sub-carrier simultaneously. In still another implementation of such an embodiment, the receiver in display 200 has a frequency hopping mechanism that allows it to listen across multiple subcarriers in order to extract a "real time" logical channel from a plurality of subcarriers. This latter embodiment has advantages in terms of security because the utility messages are transmitted split across multiple subcarrier frequencies, making it more difficult to tamper with the messages.

5.8 Additional Embodiments and Advantages of the Present Invention

For the millions of small customers, which are the main contributors to the well known utility grid evening energy peak, it is increasingly difficult to reach a large population of customers in a specific area that is impacted by the constraints of the electrical grid, due to segmentation of media markets, satellite based broadcasting, etc. The fundamental problem of reaching millions of small energy users that combine to create one big peak in energy use in the evening has been a problem with no solution—and getting worse. In seeking a technology and infrastructure that would meet the needs of customers served in specific areas, the typical approaches would be cellular radio, radio paging systems, television, radio and satellite broadcasting, as well as the internet. To be of most use to electrical grid operations, a location based service with <100 km radius and non-connection based links eliminates all the technologies in the infrastructure list except paging and datacasting technology. In the event that wireless internet services begin location based services, this approach will be useful on that infrastructure as well.

A significant challenge with reaching millions of small customers (e.g., residential utility customers) is economics—the total cost of pricing programs for utilities and independent market operators (IMO's). Electrical marketers are going the direction of time of use (TOU) and critical peak pricing (CPP). CPP's are intended to be used by the market about a dozen times per year, and existing technologies would generally require either maintaining a centralized database of appliance IP addresses or actively polling an internet CPP/Tariff server by appliances. Neither of these approaches allows for broadcasts or "pushing" of data for comprehensive real-time delivery of information. Moreover, both TOU and CPP generally require the replacement of the electrical meter at each residence—a substantial cost requiring trained personnel and associated limitations to roll the system out. This is because customers can't install it themselves, an electrician is required.

The systems and methods proposed herein have the advantage of providing a continuous on line and dedicated way of getting utility and energy information directly to utility customers. The customer does not have to go looking for the information. This dedicated channel can ensure delivery of actionable information at the actual load location—appliances, etc., without the need for wiring or trained installers. In embodiments in which display 200 is fed current utility use data, some wiring is required to provide such data. However, not all embodiments of display 200 provide such a service and in embodiments that do not monitor utility usage information, no wiring is required. Energy information can also be delivered to specific geographic areas—limited, for example, by the radio station coverage and geographic resolution within such radio station coverage using the technology described in Wang et al. This geographic resolution is well matched to grid coverage.

Another advantage of the present invention is the messaging from grid operation centers and individual energy providers. They only need to specify which messages are to be delivered to a specific area, and no connection between the broadcaster and receiver is negotiated (connectionless service). The display 200 only needs to be in the desired broadcast/datacast area. The utility customer is then able to receive "grid side" data as well as, in some embodiments, in home data from their meter. In some embodiments, display 200 stores and plays canned messages that are particularly useful in reinforcing demand response behavior. An additional benefit of such canned, or pre-programmed, messages is that it reduces communication bandwidth requirements and source coding demands to convey commonly utilized messages. Moreover, with a dedicated display 200 capable of receiving pertinent utility messages, the grid/market operator can effectively communicate with utility customers where and when it matters the most.

One of the advantages of the present invention is the fact that no regulatory approval is required to implement the systems and methods of the present invention. Utilities tend to move slowly in adopting new procedures, in part because such decisions to undertake programs need to be well analyzed before execution so that the requirements of regulatory approval are met. This makes it difficult to get any new technologies and approaches into the utility grid, even though new ways of operating are needed. For any new system to move into use quickly, it will need to avoid such regulation. Thus, one advantage of the present inventive systems and methods is that they involve FM datacasting for which there is no restriction on sending out public information. In fact much information on grid operation is already publicly available. For example, the data provided in Section 5.9 was obtained from the Alberta Electric System Operator in Alberta, Canada on its home page URL (www.aeso.ca). Such information can be datacasted via existing RBDS. The present invention addresses the challenge of how to get such information in front of people and their appliances, where and when it matters most. To get public information in the right place requires a different format of FM digital receiver one that receives the RBDS information and then displays it to the operator of the appliance, before the appliance is used. Because the new receiver does not control the appliance directly, no electrical safety approvals will be required and there is no liability associated with the display device as the human operator is still "in the loop." In some embodiments, display 200 is built into appliances within the household that require significant amounts of electricity, such as refrigerators, dryers, hot water heaters, central air conditioning, central heating, central vacuuming, etc.

The systems and methods of the present invention further have the operational benefit of random turnoff times that would avoid step changes to the load on the electrical grid when high numbers of customers respond to UMC signals. Furthermore, the FM receiver within displays 200 can be battery supported for long periods, so the receiver can be used without contributing to the grid problem, and also can be used in the event of extended power outage to communicate with customers in their homes. No Internet addressing requirements are required, making the unit easy to install and operate, as no setup would be required. In some embodiments display 200 is battery operated but includes an electrical cord so that the display 200 can be powered by a standard electrical outlet. In such embodiments, the battery serves as backup power during periods of power outage. RDS or other transmitters preferably include batteries or other power backup systems.

5.9 Exemplary Utility Information Data

Utility companies often publish information relating to current utility load on the Internet. Advantageously, in the systems and methods of the present invention, such information can be broadcasted using FM subcarrier channels such as RDS to displays 200. Such information can include a description of overall utility load, or the current availability of alternative electrical energy supplies. For example, the Alberta Electric System Operator (AESO) in Calgary, Canada, publishes the following data on the overall status of the electric grid operated by AESO. All values are listed in megawatts. In Table 1, the total net energy generated by AESO is compared with internal demand and load responsibility. In Table 1, the abbreviation DCR means dispatched (and accepted) contingency reserve.

TABLE 1

Utility information for the AESO electric grid on Mar. 7, 2005

| | |
|---|---|
| Alberta Total Net Generation | 7993 |
| Interchange | 15 |
| Alberta Internal Demand | 7978 |
| Alberta Load Responsibility | 7262 |
| Contingency Reserve Required | 498 |
| Dispatched Contingency Reserve (DCR) | 502 |
| Dispatched Contingency Reserve - Gen | 345 |
| Dispatched Contingency Reserve - Other | 157 |

In addition to overall electric grid properties, AESO publishes status of energy generation from specific types of resources such as wind (Table 2) and hydroelectric power (Table 3). Such information can be communicated using the systems and methods of the present invention to displays 200 so that utility customers can make informed decisions on when to use power. Typically, such users would postpone energy consuming tasks to those points in time when more renewable energy resources were being using to generate power (e.g., wind and hydroelectric power as opposed to coal and gas). In Tables 2 and 3, the term MCR means maximum continuous rating, and the term TNG means total net generation. All values are listed in megawatts.

TABLE 2

Utility information for AESO wind generators on Mar. 7, 2005
WIND AND OTHER

| | UNIT | | |
|---|---|---|---|
| | MCR | TNG | DCR |
| APF Athabasca | 99 | 52 | 0 |
| Castle River #1 | 40 | 37 | 0 |
| Cowley Ridge | 38 | 33 | 0 |
| Drayton Valley | 11 | 0 | 0 |
| Grande Prairie EcoPower | 25 | 6 | 0 |
| McBride Lake Windfarm | 75 | 70 | 0 |
| Summerview | 68.4 | 62 | 0 |
| Suncor Magrath | 30 | 29 | 0 |
| Westlock | 17.5 | 0 | 0 |
| Whitecourt Power | 25 | 23 | 0 |

TABLE 3

Utility information for AESO hydroelectric generators on Mar. 7, 2005
HYDRO

| | UNIT | | |
|---|---|---|---|
| | MCR | TNG | DCR |
| Bighorn Hydro | 120 | 34 | 10 |
| Bow River Hydro | 319 | 165 | 26 |
| Brazeau Hydro | 350 | 43 | 128 |

TABLE 3-continued

Utility information for AESO hydroelectric generators on Mar. 7, 2005
HYDRO

| | UNIT | | |
|---|---|---|---|
| | MCR | TNG | DCR |
| CUPC Oldman River | 32 | 7 | 0 |
| Chin Chute | 11 | 0 | 0 |
| Irrican Hydro | 7 | 0 | 0 |
| Raymond Reservoir | 18 | 0 | 0 |
| Taylor Hydro | 12 | 0 | 0 |

5.10 Additional Features

In some embodiments, display 200 is a dedicated human interface system rather than a direct controller. However, in some embodiments, display 200 provides either digital outputs or wireless connections that local appliances can use if they do not have a display 200. Advantageously, no addressing scheme is required to implement such embodiments, only reception of a UMC signal for that geographic area, although geolocation based schemes can be used as they become available on the Internet or other means described above.

In one embodiment of the present invention, display 200 and the subcarrier network used to deliver information to a network of such displays has any combination of the following features. Messages from utility operators in an FM radio network (e.g., water, electricity, gas, garbage pickup, hazardous waste pickup services) can be delivered. Such messages can be "canned" in displays 200, or delivered in real-time to displays 200. The messages can be location dependent and delivery can be performed by wireless datacast using FM subcarriers. Display 200 can include a software defined radio that allows receipt of messages to switch receiving frequencies. Multiple datacast stations can be used in order to provide frequency diversity and higher data capacity in the overall system. Data capacity can be increased by adding datacast stations, which also increases reliability. Utility provider customers can choose, and pay for, different data delivery priority and reliability levels (QOS) and the system of FM subcarrier transmitters can manage the number of transmitting stations on a dynamic basis. Consumer customers can buy their own displays 200 with various features. Utility providers can purchase displays 200 and deliver to their customer base as part of a utility contract offering. Redundant datacast transmitters can be used to provide significant system uptime using existing infrastructure. Such architecture is suitable for remote locations and reduces the requirement for human operators at remote water treatment/management facilities. Display 200 can include a scanning receiver that can sweep the FM bands to locate any datacast, and receive instruction to move to relevant frequency. Messages can be scrambled across frequencies and times to avoid jamming or tampering, in addition to data encryption.

5.11 Receiver Types

A number of different embodiments of the radio receiver present in display 200 have been described. This section details various different modes offered by some embodiments of display 200. Some embodiments have all or a portion of these modes.

In some embodiments, the FM radio receiver of display 200 includes an auto-scan mode in which the receiver auto-scans the FM band looking for an RDS datacast. When one is found, it can decode the data stream and determine if messages targeted for it are at that frequency or if it should scan to another frequency. In some embodiments, this process is aided by the data stream indicating which frequency the receiver should go to. Such a message can be termed a "directory" message. This dual process ensures timely message delivery, even in the event of a datacast failure.

Simple pushbutton input of display 200 is used to allow users to indicate when they are responding to any of the messages displayed by the UMC receiver. This input device can also be used for demand response applications, simple setup selections for cases where time references are available across time boundaries An energy price ticker receiver mode is used when a utility seeks informed customers. In such an embodiment, the receiver displays current energy price once a minute, or at the push of a wake-up button.

A critical utility status receiver mode in which only critical messages and flashes associated with such symbol(s) are transmitted and/or processed by displays 200. Such a mode can be widely embedded in most appliances due to its simplicity and associated low cost.

A home dashboard receiver mode that can receive messages from all unencrypted datacast services, plus allow coding for subscribed services, receipt of downloadable symbols, as well as communication with home energy meters and the identification of when a home has energy peaks that coincide with utility demand peaks. These circumstances can be communicated with a symbol sets instead of graphs and charts. Such a mode has the advantage of receiving utility side information (real time pricing and grid status) as well as information from the home itself. Thus information is obtained in real time and can be used to adjust energy consumption patterns accordingly.

5.12 Provider Customer Service Classes

The present invention contemplates different classes of customer service. In a critical timing, mass coverage, location coverage creation class of service, all or many datacast frequencies are used simultaneously to ensure that messages get to all users in a given area that is defined at the time the message is created (on the fly). For example, such message can convey critical price points (CPPs) for energy, or alternately a grid reliability warning to all users to reduce use or face outages. Further, critical weather warning—flash floods, dam safety warnings, tsunamis, etc., can be communicated. Such a service is typically used infrequently but requires mass coverage. Display 200, because of its ongoing use for other utility purposes, is well suited to provide this emergency service and is best able to guarantee message delivery. Messages are generated by market operators, government agencies, etc. and delivered to FM radio stations that provide a subcarrier service. The network authenticates the user and message and delivers over requested areas immediately In a cyclical timing, coverage predefined, service, less immediate delivery and less coverage is needed. Further, time delivery adheres to flexible constraints (e.g., minutes or hours after delivery to the FM subcarrier). Energy providers use this service to message their "responder" customers. Responder customers are ones that can and will adjust their energy consumption at times chosen/needed by the energy/utility provider in order to build demand response (DR) into the energy market. This service is used on a daily basis or less often, and typically uses precoded messages that are decoded by display 200.

A prescheduled timing, predefined coverage, service is used for scheduled events like lawn watering schedules, garbage collection, etc. This service has a relatively low cost and is used where schedules are known well in advance and easily queued by the system. Such messages can be preempted by higher priority messages

5.13 Pilot System Test Procedures

To demonstrate the utility of the systems and methods of the present invention in facilitating demand response (DR) applications, and the level of DR in a given area, a pair of instrumented feeders with similar demographics is identified. One feeder is used as a control and the other is "stimulated" with utility messages delivered via display 200. There must be sufficient penetration of devices in that area such that when the estimated 50% of people with displays 200 respond to a message, the response is measurable using the utility's existing feeder instruments. The minimum number of display units 200 down the line from a feeder instrument would roughly correspond to the minimum resolution step of the instrument—typically 0.25% of full scale value calculated in watts (~VA), divided by the estimated 100 W saved per UMC receiver, then divided by the percentage of responders (0.5 for 50%). This is the minimum number of receivers that will show a measurable response on a given feeder, and a measure by which a community could be credited for DR activity. Higher penetration of displays 200 will provide a better measure of DR at any given location. Of course, any location with an interval meter installed will be able to measure the response at that location.

It is known from organizations researching energy bill information that customers find them difficult to understand, much less respond to. The simple stimulus response approach of display 200 to flash a light to get attention, deliver a short text message instruction, wait for response, deliver a short recognition message, and an estimate of the money saved from the DR action will advantageously address the need of making a population more responsive to energy grid emergencies.

5.14 Appliance Load Shedding/Balancing Using Broadcast Tariff Data

One aspect of the present invention comprises a system and method for reliably and cost effectively disseminating power tariff information directly from a tariff setting body to an microcontrollers embedded in appliances (e.g., household appliances such as dishwashers and dryers). Such appliances, in turn, use this information to regulate appliance usage in a manner so as to minimize utility costs subject to any constraints needed to accommodate appliance user life style choices. In a particular embodiment, such appliances provide the user with the ability to encode such cost/convenience trade-offs through a suitable man machine interface (MMI). This is illustrated, for example, by way of a programmable HVAC thermostat controller example disclosed below. In some embodiments, the MMI allows for the temporary override of user programmed settings. Such a feature is desirable to have, for example, in clothes dryers. Nominally, the owner may have programmed the appliance to fully power the elements during low tariff times only. However, from time to time, an emergency may come up in which clothing needs to be dried as soon as possible. In such instances, the override can be used to power the elements at full power, thus consuming more energy per unit time in order to satisfy the immediate needs of the user. Such override flexibility is an important feature of the present invention.

Figure 5:
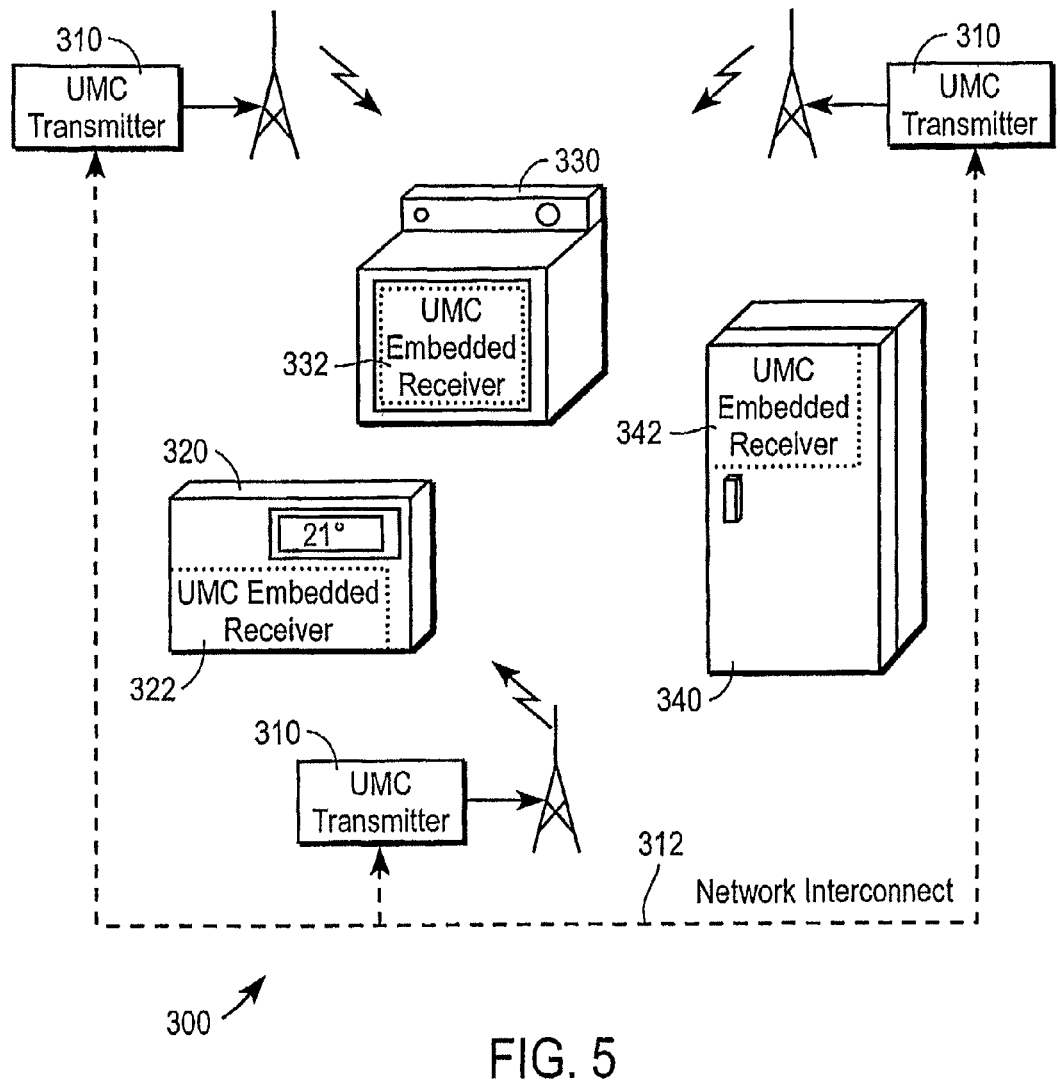
FIG. 5 illustrates an energy management system in accordance with an embodiment of the present invention.

Referring now to FIG. 5, a utility message channel (UMC) system 300 for disseminating utility information, at the appliance level, within a geographic region, is disclosed. UMC system 300 includes one or more transmitters 310 that wirelessly broadcast tariff information directly to receivers 322, 332, 342 embedded within energy consuming appliances 320, 330, 340, respectively. In a preferred embodiment, each transmitter 310 is operable to transmit information over one or more FM radio 57 KHz sub-carrier channels using the standards based RDS/RBDS datacast protocol. Applicable RDS/RBDS systems and protocols may be found, for example, in the following references, each of which is incorporated by reference herein in its entirety: EIA/NAB National Radio Systems Committee: United States RBDS Standard, Apr. 9, 1998, Specification of the radio broadcast data system (RBDS); EIA/NAB National Radio Systems Committee: RBDS versus RDS—What are the differences and how can receivers cope with both systems, January 1998; ISO/FDIS 14819-1:2002(E), Traffic and Traveller Information (TTI)—TTI Messages visa Traffic Messages Coding—Part 1: Coding protocol for Radio Data System—Traffic Message Channel (RDS-TMC) using ALERT-C; ISO/FDIS 14819-2:2002(E), Traffic and Traveller Information (TTI)—TTI Messages visa Traffic Messages Coding—Part 2: Event and information codes for Radio Data System—Traffic Message Channel (RDS-TMC); ISO/DIS 14819-3:2001, Traffic and Traveler Information (TTI)—TTI Messages visa Traffic Messages Coding—Part 3: Location referencing for ALERT-C; ISO/DIS 14819-6:2004, Traffic and Traveler Information (TTI)—TTI Messages visa Traffic Messages Coding—Part 6: Encryption and conditional access for the Radio Data System—Traffic Message Channel ALERT C coding; and prEN/ISO 14819-6:2002, Traffic and Traveler Information (TTI)—TTI Messages visa Traffic Messages Coding—Part 6: Encryption and conditional access for the Radio Data System—Traffic Message Channel RDS-TMC ALERT C coding.

In other preferred embodiments, each transmitter 310 is operable to transmit data in digital sidebands of an AM or FM transmission using an IBOC digital broadcasting protocol. Additional information regarding applicable IBOC systems may be found, for example, in U.S. patent application Ser. No. 11/053,145, filed Feb. 5, 2005; Johnson, "The Structure and Generation of Robust Waveforms for AM IN-Band On-Channel Digital Broadcasting", iBiquity Digital Corporation, http://www.ibiquity.com/technology/pdf/Waveforms_AM.pdf; and Peyla, "The Structure and Generation of Robust Waveforms for FM IN-Band On-Channel Digital Broadcasting", iBiquity Digital Corporation, http://www.ibiquity.com/technology/pdf/Waveforms_FM.pdf, each of which is hereby incorporated by reference in its entirety.

One skilled in the art will appreciate that, while system 200 of FIG. 5 and related exemplary embodiments are described herein as employing RDS/RDBS and/or IBOC transmitters and signals, other networked radio/data broadcast systems or wireless wide area network (WAN) systems can be used (collectively termed herein "wide-area wireless communication systems"). Such wide-area wireless communication systems are capable of delivering tariff data directly to receivers embedded within appliances, without reliance on additional local area networks or other communications infrastructure at the premises of the appliance.

Exemplary wide-area wireless communication systems employed within embodiments of the present invention include, but are not limited to: analog cellular (e.g., TIA 464B dual-tone multi-frequency, analog modem), digital cellular such as cellular digital packet data (CDPD), general packet radio services (GPRS), enhanced data rates for GSM evolution (EDGE), Mobitex, two-way paging (e.g., ReFlex), the Ardis network, satellite (e.g., TDM/TDMA X.25 VSAT networks), WiMAX (IEEE 802.16 MAN, hereby incorporated by reference), WiFi (802.11), and networked AM, FM, high definition radio, TV and satellite radio broadcast systems including any subsidiary communications multiplex operation sub-carriers offered by any of the aforementioned systems. Applicable systems preferably exhibit all or at least some of the following properties: (i) wide area redundant coverage, (ii) non-line of site in-building signal penetration, (iii) compliance with international/national standards, (iv) multicast/broadcast capability (e.g., data is pushed to more than one appliance simultaneously), and (v) low operational and capital costs for both the base station (e.g., transmitters 310) and receiver equipment (e.g., imbedded receivers 322, 332, and 342); (vi) lower power receiver operation; and (vii) operation in a licensed spectrum. An advantage of such systems is that no transmitters are required within utility customer residences or buildings. As such, the systems and methods of the present invention provide cost effective ways of providing voluntary programmable load shedding with individual utility customers (e.g., residences), or better (e.g. appliance level granularity or aggregated appliance level granularity).

Referring again to FIG. 5, preferably a geographic region is covered by more than one transmitter 310 each of which broadcasts on a different transmit frequency, e.g., within the 88 MHz to 108 MHz frequency spectrum. Furthermore these transmitters are preferably located at geographically disparate locations, and preferably communicate with each other over a network interconnect 312.

The configuration illustrated in FIG. 5 affords two benefits. First, system 300 is reliable because of the use of redundant equipment. For instance, if one UMC transmitter is disabled, operation of the system continues using other redundant UMC transmitters. System robustness is especially enhanced in embodiments where the power and communication interconnects of such redundant equipment (e.g., redundant transmitters) are also independent from each other. Second, the use of redundant equipment (e.g., redundant UMC transmitters) provides transmit diversity that prevents multipath distortion. It is well known that obstacles within the vicinity of a radio wave communication path often reflect the transmit signal thereby giving rise to multipath distortion. Under severe conditions, these reflected signals destructively add to result in a deep fade of signal strength in the vicinity of intended receivers. Several methods are known to prevent such signal fades. In one such method, identical information is broadcasted on separate channels using different wavelengths. This results in different constructive/destructive signal additions in the vicinity of the receiver. A premise of such an approach is that, due to differences in signal wavelengths, it is much less likely that all frequency channel signals will simultaneously experience a deep fade at the receiver's antenna. In a second approach, similar information is transmitted from spatially disparate locations. In such an approach, two or more distinct and independent communication paths exist and will therefore likely exhibit different fading characteristics. The probability of all signals received from the different communication paths being in a deep fade is much less likely. Any such method for ensuring that a reliable signal is available to intended receivers can be used in the present invention.

Receivers 322, 332, and 342 do not necessarily require stored parameters or other a priori knowledge of UMC broadcast frequencies for the system to function properly. For example, in one embodiment, receivers 322, 332, and 342 include an auto scan background process that continuously searches for UMC broadcasts. Such a search method is provided in more detail below. The UMC data is broadcasted on a logical channel within a physical RDS/RBDS sub-carrier broadcast channel. The physical RDS/RBDS channel typically includes many other logical channels used to convey different types of information to different types of applications. Radio receivers 322, 332, and 342 of FIG. 5, which are discussed in more detailed with reference to FIG. 7, can be configured to filter out the UMC data for processing while ignoring all other data.

In some embodiments, UMC transmitters 310 broadcast information including, for example, clock time reference data, tariff data, configuration data, and data regarding the interval time to a next UMC message. In some embodiments, clock time reference data includes, for example, metrology grade universal time coordinated (UTC) or Greenwich mean time (GMT) clock time references. Tariff data can comprise a qualified power tariff data set expressing price per unit energy consumed, including tariff data points qualifiers such as commencement and expiry time stamps with possible periodicity, applicable geographical area, applicable electrical grid area or network, and information source (e.g., an energy marketer, load distribution center, independent market operator, and the like). Similarly, configuration data can be qualified according to applicable geographical area, applicable electrical grid area or network, a unique receiver address, or a particular information source.

Not all information needs to be broadcasted in the same message or at the same data rate in the configurations in accordance with the present invention. Moreover, not all tariff data point qualifiers are always required. In many instances, for example, it is sufficient to qualify a tariff according to a particular electrical network grid, and omit the relevant geographic area. In some instances, a particular sub-carrier transmitter has broadcast coverage that is completely enveloped by single supplier of energy with tariff prices independent of geographic location within that coverage area. In such instances, electrical grid, geographic area, and information source qualifiers are not required.

Figure 7:
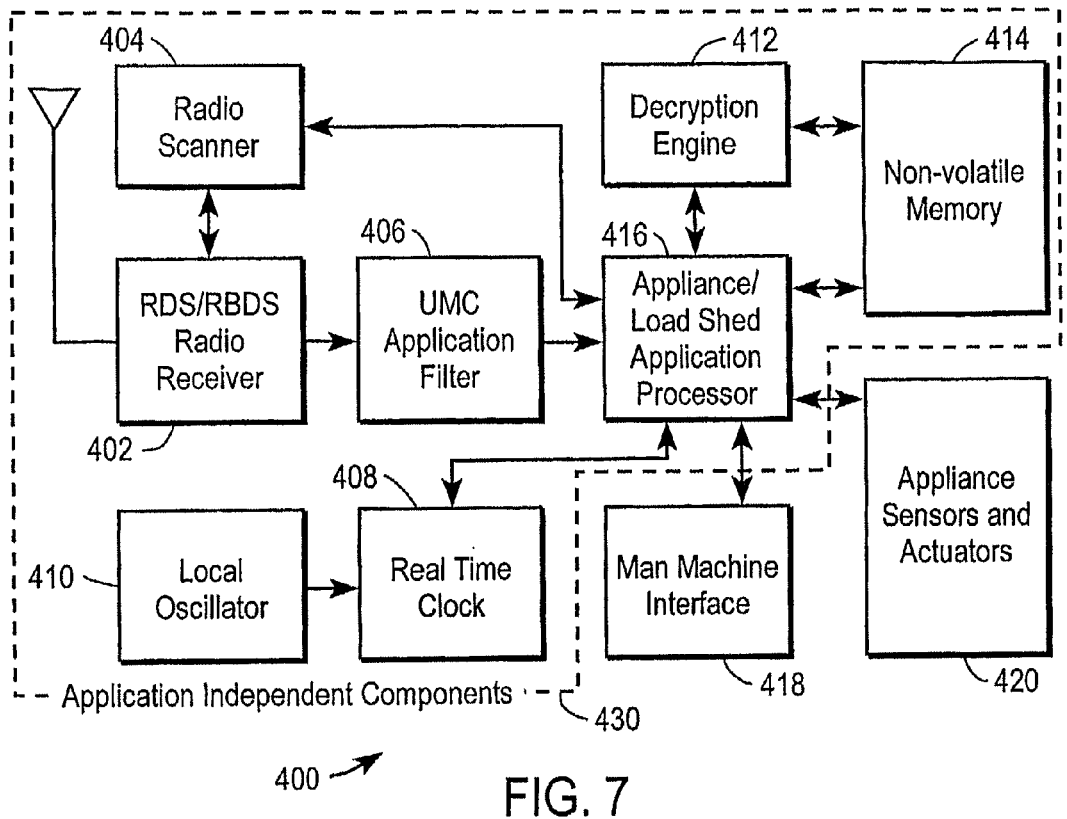
FIG. 7 illustrates an embeddable utility message channel (UMC) receiver in accordance with an embodiment of the present invention.

In some embodiments of the present invention, the broadcast data includes an "interval time to next UMC message" field or the like to inform a scanner 404 of receiver 402 of FIG. 7 when the next UMC message on a particular sub-carrier is to take place. Such information enables scanner 404 to search for UMC data on other sub-carriers without missing the next message broadcast on known UMC channels. It is also permits receiver system 400 to enter a low power standby mode during times of UMC inactivity.

Each radio transmitter 310 of FIG. 5 is further operable to schedule the transmission of UMC messages at predefined future moments in time and possibly at predefined rates periodic in time. Time scheduling is synchronized to a local real time clock which, in turn, is preferably conditioned by a metrology grade time reference (e.g. network time protocol standards based time reference server or local global positioning system receiver).

Using the scheduling mechanism above, transmitters 310 are further operable to coordinate their transmissions in time so as not to overlap when transmitting UMC information on different frequency channels. This feature enables a low cost single carrier scanning receiver to extract UMC data from more than one sub-carrier without missing UMC data on other sub-carriers. In one embodiment, each transmitter is synchronized to a metrology grade time reference such that local clock time reference uncertainty of each transmitter does not exceed ½ of the shortest interval between coordinated UMC broadcast messages.

In some embodiments, radio transmitters 310 of FIG. 5 are configured to transmit redundant information so as to achieve time diversity. It is well known that identical information transmitted at different times helps prevent time varying signal fades due to motion of either the receiver or objects within the vicinity of the communication path.

Figure 6:
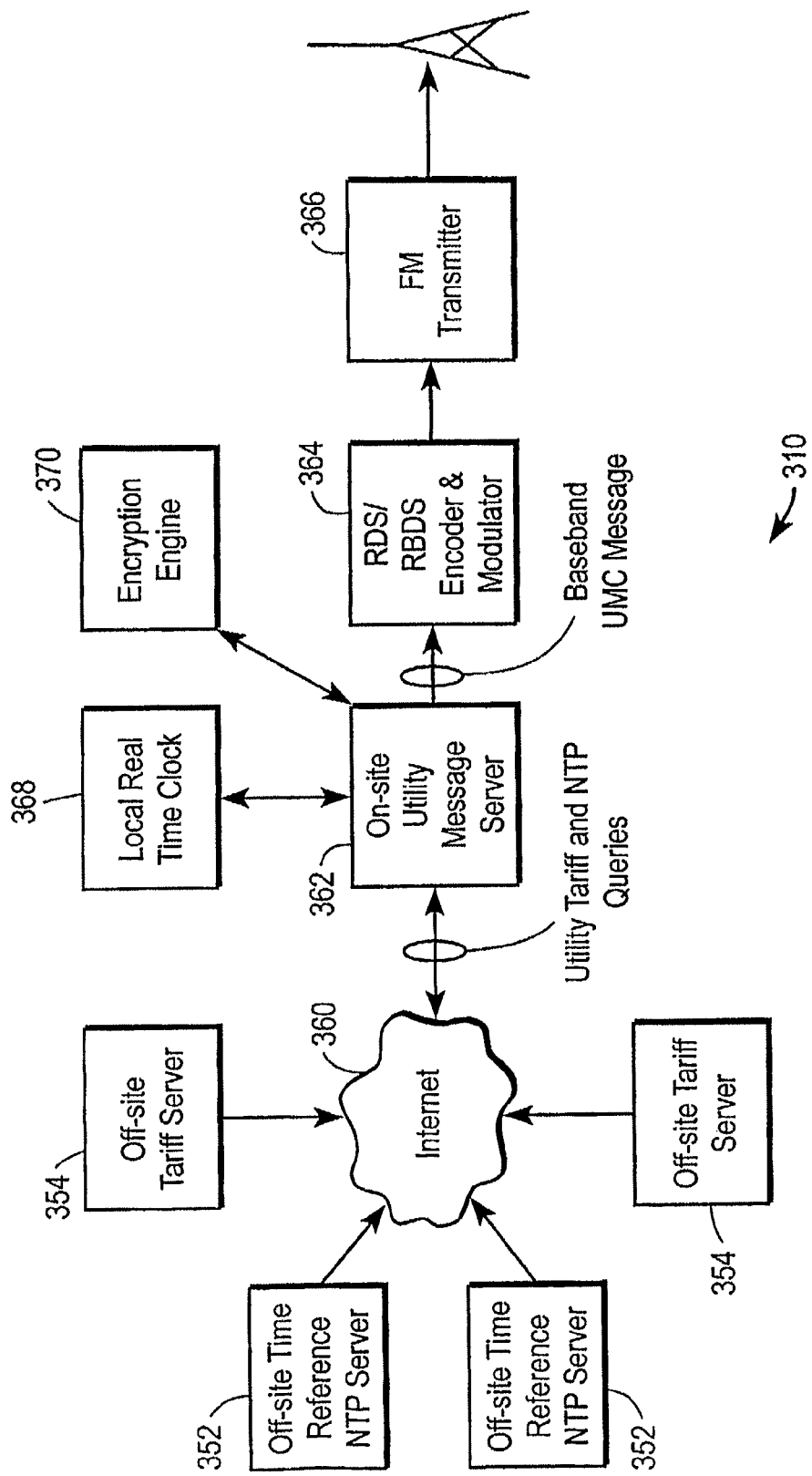
FIG. 6 illustrates a transmitter site in accordance with an embodiment of the present invention.

FIG. 6 provides a detailed block diagram of an example of transmitter system 310 for delivering tariff information directly to the appliance. In one embodiment, tariff information originating from servers 354 of recognized authorities (e.g. independent marketer organization, Ontario Energy Board, etc.) is made available to a UMC server (or UMS) 352 via Internet 360. In one embodiment, off-site tariff server 354 is realized as an XML or HTML web server preferably offering secure connectivity, for example, secure sockets layers (SSL), virtual private network (VPN), etc., and one or more redundant geographically disparate mirror sites to improve UMC system fault tolerance.

In one embodiment UMC server 362 includes a computer with stored program control, non-volatile memory, connectivity to the Internet, and connectivity to RDS/RBDS modulator 364. Server 362 also includes or communicates with a local real time clock 368 and an encryption engine 370. Typically, server 362 is battery backed and collocated with on-site battery backed FM broadcast equipment 366.

UMC server 362 of FIG. 6 is operable to periodically poll tariff server(s) 354 in order to extract up-to-date tariff rate information. In varying embodiments, this polled information is real time price information that is valid immediately upon receipt, pricing information that is valid for a specific duration of time (e.g., at least one minute, at least five minutes, at least one half hour, at least one hour, less than 24 hours, less than two days, between one day and a week, two weeks or less, or a month or less) commencing at a future time point (e.g., in an hour, in a day, in a week, etc.), or cyclic in time.

UMC server 362 of FIG. 6 is also operable to extract, via internet 360, a nationally recognized metrology grade time reference source (e.g. a time reference provided by the United States National Institute of Standards and Technology) from one or more time reference servers 352. In some embodiments, access to time reference servers 352 is made by the Network Time Protocol, RFC 1305, "Network Time Protocol (Version 3) Specification, Implementation," which is hereby incorporated by reference in its entirety. Alternatively, UMS 362 can extract a time reference from a co-located and interconnected GPS receiver (not shown). The extracted time reference data is used to condition the local real time clock 368 to maintain UMC message scheduling accuracy. In varying embodiments, local real time clock 368 is an integral part of UMS server 362 or it is a separate peripheral device.

In some embodiments UMC server 362 is configured to store the URLs of the tariff and time reference servers 354, 352, respectively, and possibly their mirror sites. In some embodiments UMC server 362 is configured to automatically select a tariff and time reference server 352 that is "up" and available using Internet 360. Such selection methods are well known in the art.

Exemplary UMC receiver system 400, as shown in FIG. 7, provides an example of a UMC receiver in accordance with an embodiment of the present invention. Receiver 400 includes an RDS/RBDS receiver 402, a radio scanner/processor 404, a UMC application filter 406, real time clock 408, local oscillator 410, decryption engine 412, non-volatile memory 414, and application processor 416.

Radio scanner 404 is operable to digitally tune the single carrier RDS/RBDS receiver 402 to all possible sub-carrier frequencies within a licensed FM radio spectrum. Functionality of radio scanner 404 is detailed later herein and in one embodiment is implemented as a subroutine that executes on appliance processor 416.

In some embodiments, RDS/RBDS radio receiver 402 is configured to demodulate and decode standards based RDS or RBDS datacasts originating on a sub-carrier tuned by radio scanner 404. RDS/RBDS receiver 402 includes a tuning circuit whose receive frequency is digitally controllable over the FM radio spectrum. The output of radio receiver 402 is a stream of error corrected digital payload data similar to that of the input data presented to the RDS/RBDS encoder and modulator 364 of FIG. 6. In some embodiments, RDS/RBDS radio receiver 402 is configured to indicate to radio scanner 404 the presence or absence of RDS/RBDS modulated data on the currently tuned sub-carrier that is of sufficient signal to noise ratio to permit reliable demodulation.

UMC application filter 406 is operable to continuously scan through the decoded data originating from RDS/RBDS receiver 402 in search for utility message channel (UMC) data as identified by a unique open data applications (ODA) identifier as assigned by an applicable RDS/RBDS regulatory authority. In this exemplary embodiments, only UMC message types are passed to application processor 416 for further processing. In some embodiments, UMC application filter 406 functionality as detailed herein is implemented as a subroutine that executes on appliance processor 416.

Decryption engine 412 (FIG. 7) is operable to decrypt payload data encrypted by encryption engine 370 (FIG. 6) of transmitter 310 using, for example, a secret private UMC key. The private UMC encryption key is known by receiver 400 and stored within non-volatile memory 414. Preferably non-volatile memory 414, in which the private key is stored, and decryption engine 412, which uses the key, is implemented within the same integrated circuit in order to prevent reverse engineering efforts to uncover the private key. In addition, in a preferred embodiment, decryption engine 412 and non-volatile key storage area 414 are implemented at the integrated circuit level using reverse engineering countermeasures that are well known in the smart card industry. Preferably, decryption and encryption engines 412, 370, respectively, are capable of implementing robust private key encryption schemes such as the advanced encryption standard (AES; e.g., the May 26, 2002, Federal Information Processing Standards Publication 197, The National Institute of Standards and Technology, which is hereby incorporated by reference in its entirety) and the data encryption standard (DES; e.g., the Jan. 22, 1988, Federal Information Processing Standards Publication 46-2, The National Institute of Standards and Technology, which is hereby incorporated by reference in its entirety) at encode levels in excess of 64 bits.

Real time clock 408 is preferably implemented in hardware as a well known loadable counter preferably, although not necessarily, able to resolve time down to approximately a one second granularity. The local oscillator provides the counter clock, the required accuracy of which is a function of the worst case (e.g. longest) UMC message time reference update interval and the required accuracy of the application. Preferably, the UMC message time reference update period is at least once every at most 1000 seconds. A real time clock error of one second, for example, would therefore necessitate the selection of a local oscillator with an absolute accuracy of 1 part per 1000 over the UMC receiver's operating temperature and life expectancy. Low cost crystals or crystal oscillators that meet these criteria are commercially available. In some embodiments, real time clock 408 counter is read from and written to (e.g. loaded) using a microprocessor interface that is well known in the industry. In some embodiments, the real time clock accuracy is maintained by periodically loading the counter with updated time reference data received in a UMC message. In some embodiments, real time clock 408 is a peripheral device integrated on the same die or within the same integrated chip package as application processor 416.

Application processor 416 is operable to interact with radio scanner 404, UMC application filter 406, decryption engine 412, real time clock 408, non-volatile memory 414, local RAM (not shown), man-machine interface peripherals 418, and external digitized appliance sensors and actuators 420 using known microprocessor interfaces such as, for example, synchronous serial interfaces. Exemplary interfaces include, but are not limited to, the serial peripheral interface (SPI) and I2C as well as asynchronous communication interfaces using multiplexed Intel or demultiplexed Motorola type address and data buses with chip select, address, and data strobes and read/write signals. In some embodiments, appliance application processor 416 is configured to extract time reference and tariff information from UMC messages, update real time clock 408 according to received time reference data, and store received power tariff information in either non-volatile memory 414 or local random access memory (not shown). In some embodiments, application processor 416 is configured to execute application code specific to the appliance within which it is embedded. This feature is exemplified by means of a HVAC thermostat embodiment disclosed below.

In some embodiments, appliance processor 416, via the external interface port, is operable to function as a slave device to an external host in a manner that is known in the art. With the exception of the encryption key identity, all data accessible to application processor 416 is made available to an external host processor interconnected via such a port. In some embodiments, this port is realized as an SPI or I2C serial interface. In some embodiments, appliance application processor 416, through embedded program code stored in non-volatile memory 414, also assumes the functionality of decryption engine 412, UMC application filter 406, and/or radio scanner 404.

In some embodiments, radio scanner 404, RDS/RBDS radio receiver 402, UMC application filter 406, real time clock 408, decryption engine 412, non-volatile memory 414, and/or appliance application processor 416 are implemented as an integrated circuit on a common substrate or, at minimum, within a common printed circuit board package.

In one embodiment, UMC receiver 400 employs a method of extracting UMC data from FM sub-carrier transmissions. In step 1002 of the method, radio scanner 404 tunes RDS/RBDS receiver 402 to sequentially scan through all possible FM sub-carrier channels within the 87.6-107.9 MHz spectrum. The frequency, or channel number, of each detected sub-carrier having an acceptable signal to noise ratio (e.g., on the order of 10 dB) is placed in a list hereinafter referred to as the "sub-carrier list."

In step 1004 of the method, each sub-carrier channel in the "sub-carrier list" is automatically tuned-in for a predefined dwell time. During this dwell time the RDS/RBDS data stream is continuously decoded by RDS/RBDS receiver 402. In step 1006 of the method, each decoded group is automatically monitored for the presence of a "UMC application ODA ID" by UMC application filter 406. If present, the UMC application data is passed to application processor 416 where it is decrypted, if such decryption is needed, and the frequency, or channel number, and corresponding update interval parameter value, if present, of each sub-carrier that carriers the UMC message is placed in a "UMC sub-carrier list." If the update interval parameter is present then the expected receive time of the next message is computed and an interrupt is scheduled for radio scanner 404 to tune to the current sub-carrier to listen for the next UMC message at that time. If the local clock time differs from the received reference time embedded within the UMC message by more than the sum of the time reference uncertainty and path delay uncertainty bounds, then the local clock is updated to that of the received time reference. In addition, the decoded tariff information within the UMC message is queued onto the "tariff list" for processing by application processor 416. Finally, upon power up, all interrupts are cleared, and if the "UMC sub-carrier list" exists, e.g., is stored in non-volatile memory from a previous powered state, then these channels are scanned first for a period of time equal to the corresponding last known update interval. If more that one channel is stored, then the one with the shortest update interval is tried first in some embodiments. If no time reference is found within the "UMC sub-carrier list" then execution commences at the beginning of step 1004.

Upon exhaustion of the sub-carrier list, the aforementioned steps are repeated. In some embodiments, the aforementioned steps are repeated indefinitely in a daisy chain manner. In some embodiments, the UMC "application" is registered with the appropriate RDS/RBDS governing body and is assigned a unique ODA message field ID.

One skilled in the art will appreciate that the above described method of extracting UMC data from FM sub-carrier transmissions is exemplary, and variations or other suitable methods may be used without departing from the scope of the present invention. For instance, radio frequencies other than FM can be used.

5.15 HVAC Thermostat Embodiment

Figure 8:
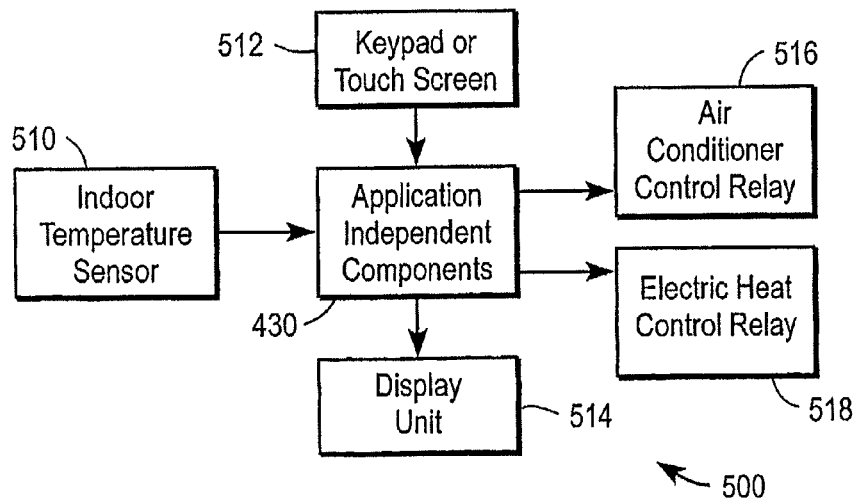
FIG. 8 illustrates a thermostat having a wireless receiver in accordance with an embodiment of the present invention.
Figure 9:
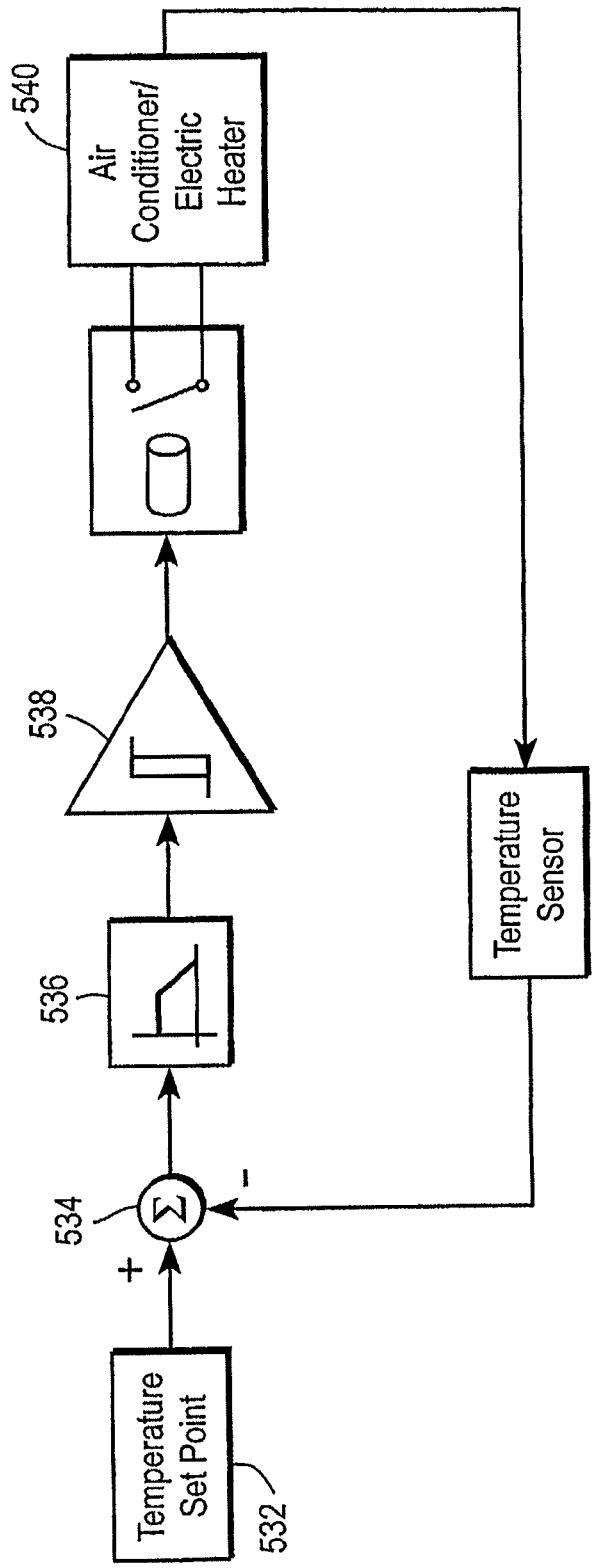
FIG. 9 illustrates a temperature controller loop typically implemented within a residential HVAC thermostat.

FIG. 8 illustrates a thermostat in accordance with one embodiment of the present invention, in which application independent components 430 of FIG. 7 are interconnected to a temperature sensor 510, relay actuators 516, 518, and interface devices such as a keypad or touch screen 512 and display unit 514. FIG. 9 is a schematic diagram of simple hysteretic on/off HVAC controller 530 typically found in the home.

Figure 10:
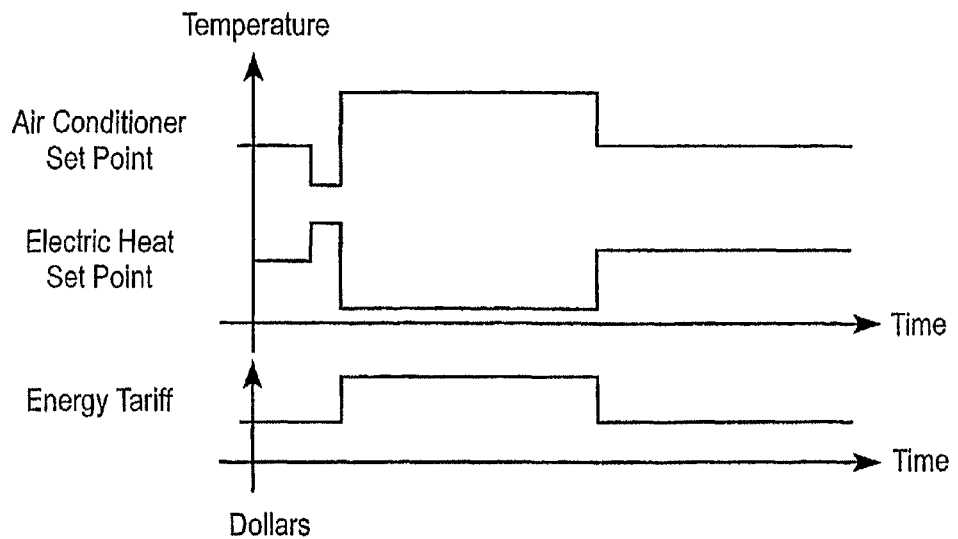
FIG. 10 illustrates a method of facilitating load shedding using energy tariff information in accordance with an embodiment of the present invention.

The present invention contemplates a simple modification to this system is which temperature set point 532 is modulated by the tariff rate in force as shown in FIG. 10. In a preferred embodiment when tariffs are known a priori, during the summer season, the HVAC controller 530 instructs air conditioner 540 to lower the room temperature somewhat below the nominal consumer defined comfort set point for a short period of time just prior to the beginning of the higher power tariffs. In so doing, additional heat is extracted from the house at a lower tariff rate in an effort to extend the time after which the air conditioner must be engaged in order to keep the temperature below the high tariff set point. At the time of higher energy rates the temperature set point is raised slightly higher than the consumer defined comfort level for a period of time equal to the duration of the higher tariff rates.

For an electric heating system, the temperature set points are reversed during the winter months. HVAC controller 500 instructs the electric heater to raise the room temperature somewhat above the nominal consumer defined comfort set point for a short period of time just prior to the beginning of the higher power tariffs. In so doing additional heat is added to the house at a lower tariff rate in an effort to extend the time after which the electric heater must be engaged in order to keep the temperature above the high tariff set point. At the time of higher energy rates the temperature set point is diminished slightly lower than the consumer defined comfort level for a period of time equal to the duration of the higher tariff rates. In some embodiments the high and low tariff temperature set points for both the air conditioner and heater on either side of the low-to-high tariff transition are consumer configurable.

Referring to FIG. 5, enhanced thermostat 500 can be implemented by interconnecting the "application independent components" 430 of FIG. 7 with a keypad 512, display unit 514, temperature sensor 510, and two control relays. One control relay (516) is for the air conditioner and the other control relay (518) is for the electric heater. Keypad 512 permits user set point programming and, in one embodiment, the ability to override the tariff dependent temperature set point operation. Temperature sensor 510 senses the ambient temperature within the building and presents a digitized representation to the application microprocessor embedded within the UMC receiver. The summation 534, low pass filter 536, and hysteresis block 538 of FIG. 9 is implemented within application processor 416 in a manner that is known in the art. In other words, application processor 416 can be a customized microprocessor that includes functionality for the aforementioned components. In the summer months application processor 416 controls the air conditioner relay, and in the winter months application processor 416 controls the electric heater.

In some embodiments, broadcast or "pushed" tariff information (e.g., over RDS/RDBS or IBOC broadcast signals) can be used in more sophisticated ways to yield a higher performance HVAC thermostat. For example, temperature set point spread on either side of a tariff change event can be modulated in near real-time by the tariff price difference on either side of the event and/or the duration of the low and high tariff rates in force.

5.16 Refrigerator and Freezer Embodiments

In some embodiments, load shed enhanced HVAC thermostat controller 500 can be used to control refrigerator and/or freezer appliances. In such embodiments, sensor 510 measures the temperature inside of the refrigerator or freezer cabinet, and air conditioner relay 516 controls the on/off state of the compressor. More sophisticated control schemes are also possible. For example, the freezer controller can employ a model that predicts the culture times of common bacteria in food as a function of temperature and time. With advanced notice of power tariff rates over a particular period of time, and optional knowledge of the consumer's food consumption patterns, a power consumption profile can be computed for that period of time that minimizes energy costs while ensuring that food does not spoil for the life expectancy, as specified by the consumer, of the frozen or refrigerated food. The power consumption profile can be further modulated by any number of parameters. Such parameters optionally include any combination of the following: the thermal properties of the storage cabinet, the degree to which the cabinet is full of food, calculated as a function of mass, and the frequency and duration with which the cabinet door is open.

5.17 Clothes Dryer Embodiment

Commercially available clothes dryers typically include three power consumption loads that can be decoupled from one another so as to be independently controlled. The loads are the drum tumbler motor, the air circulation fan, and the heating element. The drum tumbler serves two purposes: one, to expose, on a algorithmic basis, the entire surface of the cloths to air to ensure uniform drying, and two, to stop clothes from wrinkling. Both the heater element and the fan serve to increase the speed with which cloths are dried within the dryer. Typically, the tumbler motor and fan consume far less power than the heater element and are therefore of secondary consideration when considering ways to reduce power usage of a cloths dryer. To save money, the power tariff data (e.g., received by the UMC receiver 400 over an RDS/RDBS or IBOC broadcast) can be used to modulate the temperature set point within the dryer using the following scheme. At low tariff rates, the temperature set point is set to a sufficiently high temperature that minimizes dry time while ensuring that the garment is not damaged from excessive heat. As the tariff rate increases, the temperature set point is reduced so as to reduce heater element power consumption thereby increasing the dryer's reliance on the fan to dry the garments at the expense of increased dry time.

Figure 11:
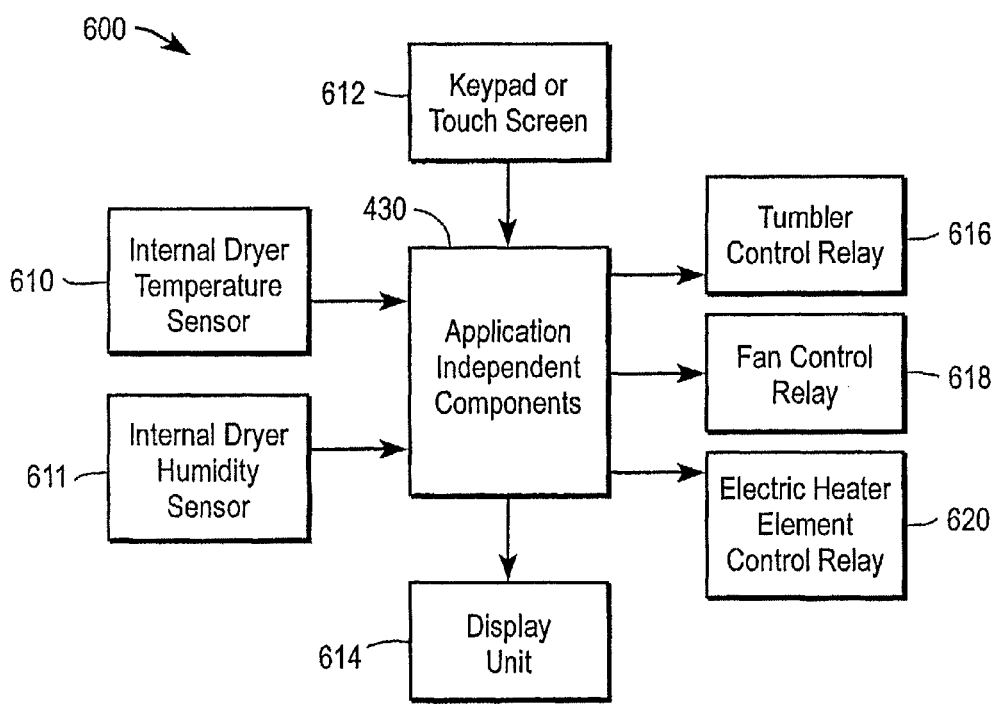
FIG. 11 illustrates an energy information and load shed system in use with a clothes dryer in accordance with an embodiment of the present invention.

In some embodiments of the present invention, illustrated in FIG. 11, an enhanced clothes dryer includes "application independent component" 430 of FIG. 7 interconnected with a keypad 612, display 614, temperature sensor 610, humidity sensor 611 and three control relays. Control relay 616 is for the tumbler, control relay 618 is for fan, and control relay 620 is for the heater element. Keypad 612 permits user temperature set point programming, and in one embodiment, the ability to override the tariff dependent temperature set point operation. Temperature sensor 610 senses the temperature within the dryer and presents a digitized representation to the application microprocessor 416 embedded within the UMC receiver 400. The summation, low pass filter, and hysteresis blocks of FIG. 5 are implemented and interconnected within application processor 416 in a manner that is well known so as to realize the control loop of FIG. 9.

Keypad 612 enables the consumer to select the clothes garment type and to start the dry cycle. Upon activation of the start button, application microcontroller 416 energize the fan and tumbler relays 616, 618, and through relay 610, permits the heater element to be activated by the temperature control system. The heater element, via heater element relay 620, is controlled by the temperature control loop that establishes and maintains the set point temperature within the dryer. Application processor 416 is further operable to change the set point temperature is accordance to energy tariffs in force. Energy tariff-to-temperature set point correspondence can be expressed as an analytic function or presented in a lookup table. Application processor 416 is further configured to monitor air exhaust humidity levels via a digitized humidity sensor and terminate the dry cycle when the detected humidity level, possibly normalized to the tumbler ambient temperature, persists below a predefined threshold level.

Figure 12:
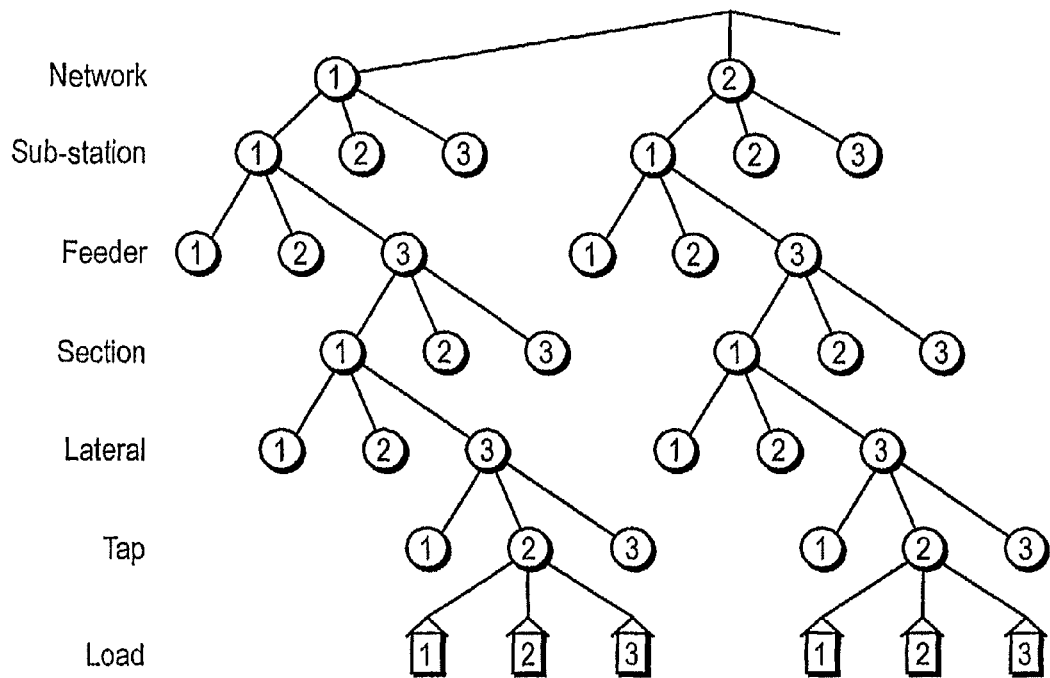
FIG. 12 illustrates an energy grid hierarchy in accordance with the art.

Referring to FIG. 12, a hierarchical addressing method 700 permits energy grid localization, rather than geographic localization, and hence addressability with successively finer degrees of resolution. Smaller addresses reference substations, expanded addresses reference feeders, and fully expanded addresses reference individual receivers. Such a hierarchical method can also be applicable in addressing consumers across service provider boundaries from generators to load aggregators. Additional digits are required for successive levels. The number of digits or bits required to address at larger granularity are successively increased. Furthermore, as shown in FIG. 12, the smallest number of bits in a code address a network, with successive increases in required number of bits for substation, feeder, section, lateral, tap and load (or individual receiver).

In some embodiments, tariff information is delivered in a controlled or graded manner to avoid the earlier described problem of power demand spikes that result from synchronized demand during utility-imposed load shedding. For example pricing can be slowly ramped down over a "shoulder period" after a peak event to allow consumer loads with individual set points to come on at their level of cost/comfort preference. Also, tariff decent during the "shoulder period" can be randomized with respect to electrical grid location. Finally, the appliance may employ a random back-off algorithm to delay the activation of an appliance for a random period of time following the cessation of a on-peak event.

5.18 Transceiver Embodiments

In some embodiments, transceivers may be used to receive UMC broadcast data and to facilitate local two-way communication (e.g., via a Personal Area Network or Local Area Network) among appliances or other hardware apparatus located within a home or business. Such transceivers may include some or all of the features and functionality of the UMC receivers described above, e.g., UMC receivers 322, 332 and/or 342, with the addition of a transmitter or other device for communicating with other elements in the local network.

One or more two-way local area transceivers may be employed, for example along with one or more wide-area receivers at each node in a network, in an Advanced Meter Infrastructure (AMI) topology that also employs, for example, automatic meter reading (AMR), demand response (DR), tamper and outage detection, and customer relations management (CRM). The topology employs the local area two way/wide area one way transceiver along with different uplink and downlink communication links.

Each transceiver preferably includes a receiver portion for receipt of multicast data in the downlink direction. Preferably, all nodes can receive wide area data. The various nodes may be mesh networked via local two way communication to facilitate the collection and consolidation of data over many neighboring homes. A mesh network is a local area network (LAN) having a number of interconnected nodes, and may employ a full mesh topology or partial mesh topology. In the full mesh topology, each node (e.g., transceiver or other device) is connected to each of the others. In the partial mesh topology, some nodes are connected to all the others, but some of the nodes are connected only to those other nodes with which they exchange the most data.

The Personal Area Network portion of the transceiver may operate in unused FM radio station channels and transmit at power levels in accordance with national regulatory limits for operation without a broadcast license. In keeping with cognitive radio concepts, the PAN system disclosed herein uses FM radio spectrum on a secondary basis: The receiver hardware dynamically and continuously monitors the FM spectrum for unused channels. When found, these unused frequency channels are used to effect two way local communication among appliances equipped with said PAN transceivers. In other embodiments, WiFi, Zigbee, or other personal or local area wireless communication protocols may be used.

Figure 13:
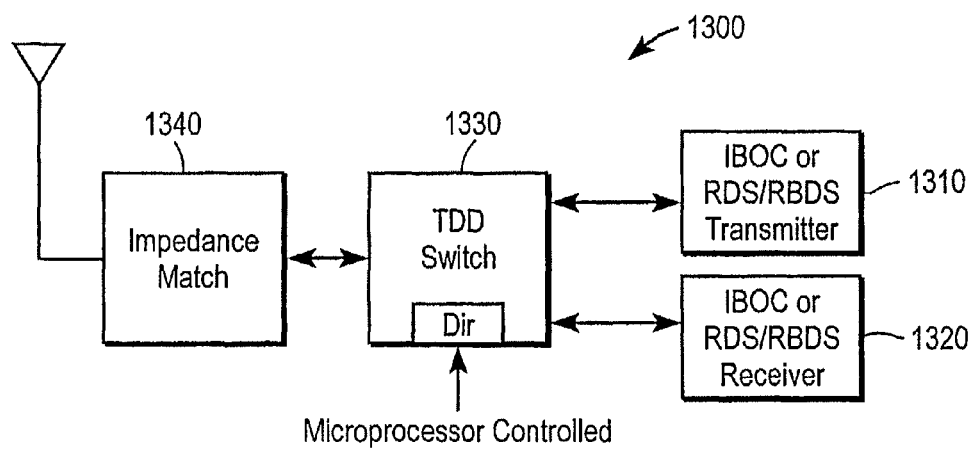
FIG. 13 illustrates a generic IBOC or RDS/RBDS transceiver according to an embodiment of the present invention.

Referring to FIG. 13, an exemplary generic IBOC or RDS/RBDS transceiver 1300 may include an IBOC or RDS/RBDS transmitter 1310 and an IBOC or RDS/RBDS receiver 1320 that communicate with a time division duplex (TDD) switch 1330, which may be computer controlled. An impedance match 1340 may also be included, e.g., communicating with switch 1330 as shown. The transceivers described herein are preferably capable of receiving data broadcast directly from FM radio stations, as described above. The transceiver uses the same receiver for both local area and wide area data. Preferably, the UMC transceiver is capable of local transmission and reception of RBDS/RDS formatted data, IBOC formatted data, or data of other formats.

Figure 14:
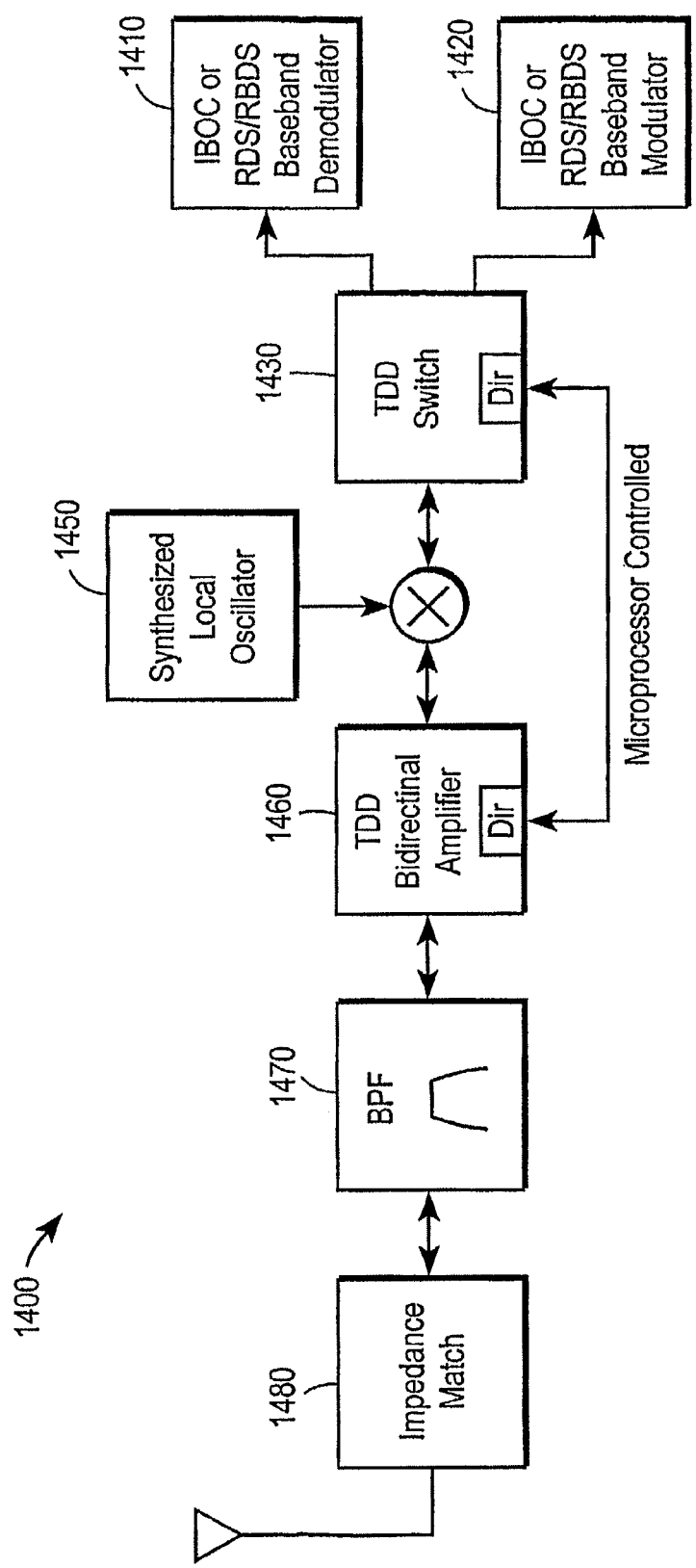
FIG. 14 illustrates an IBOC or RDS/RBDS transceiver front end with shared lower level components in an accordance with an embodiment of the present invention.

FIG. 14 illustrates an example of a front end of a transceiver 1400 with shared lower level components in accordance with another embodiment. In particular, transceiver 1400 includes a demodulator 1410 for demodulating received IBOC or RDS/RBDS signals and a modulator 1420 for modulating data to be sent over a personal area or local area network to other devices, meters or nodes in a network. A TDD switch and bidirectional amplifier may be microprocessor controlled, and may communicate with a synthesized local oscillator 1450. A band pass filter 1470 and impedance match 1480 may also be included.

Figure 15:
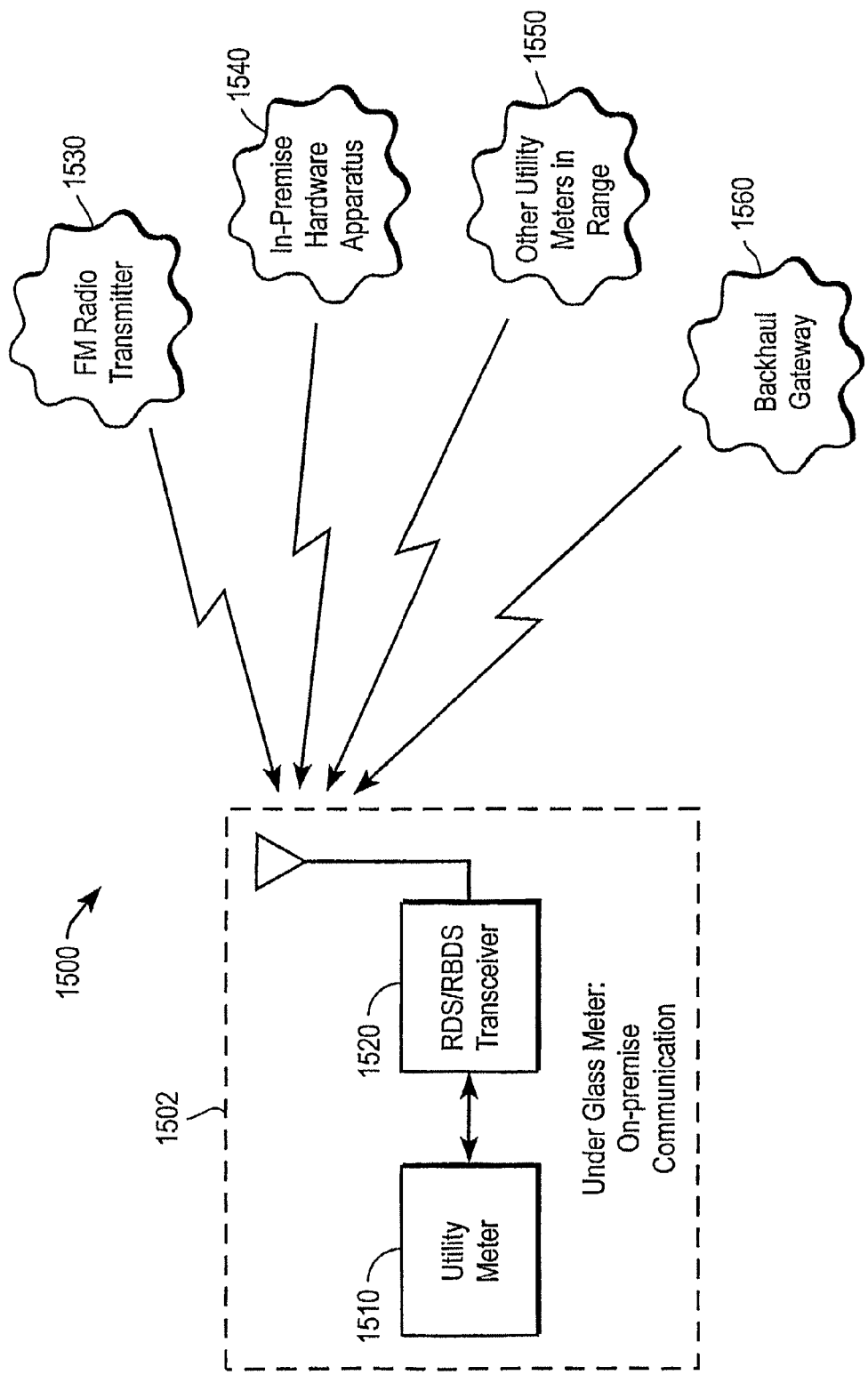
FIG. 15 illustrates a meter transceiver in accordance with an embodiment of the present invention.

Referring to FIG. 15, a UMC system 1500 employs one or more enhanced meters 1502, including, for example, a utility meter 1510 for monitoring an amount of power utilized by a household or other location. The meters are preferably in communication with a transceiver 1520 to receive broadcast UMC data from a radio transmitter 1530 (e.g., an IBOC transmitter or an RDS/RBDS transmitter). The meter 1502 also preferably communicates with other in-premise hardware apparatus 1540 and/or other utility meters 1550 within a personal area or local area network range. Data such as, for example, meter usage data may be aggregated between homes or "nodes" in a local area network and uploaded at any desired frequency through a backhaul gateway 1560 to a provider or other entity over one or more of a variety of wide area networks. While the appliances and network apparatus of the present invention are described herein in the context of household appliances and energy usage, the systems of the present invention may be used in various commercial or public environments as well.

Figure 16:
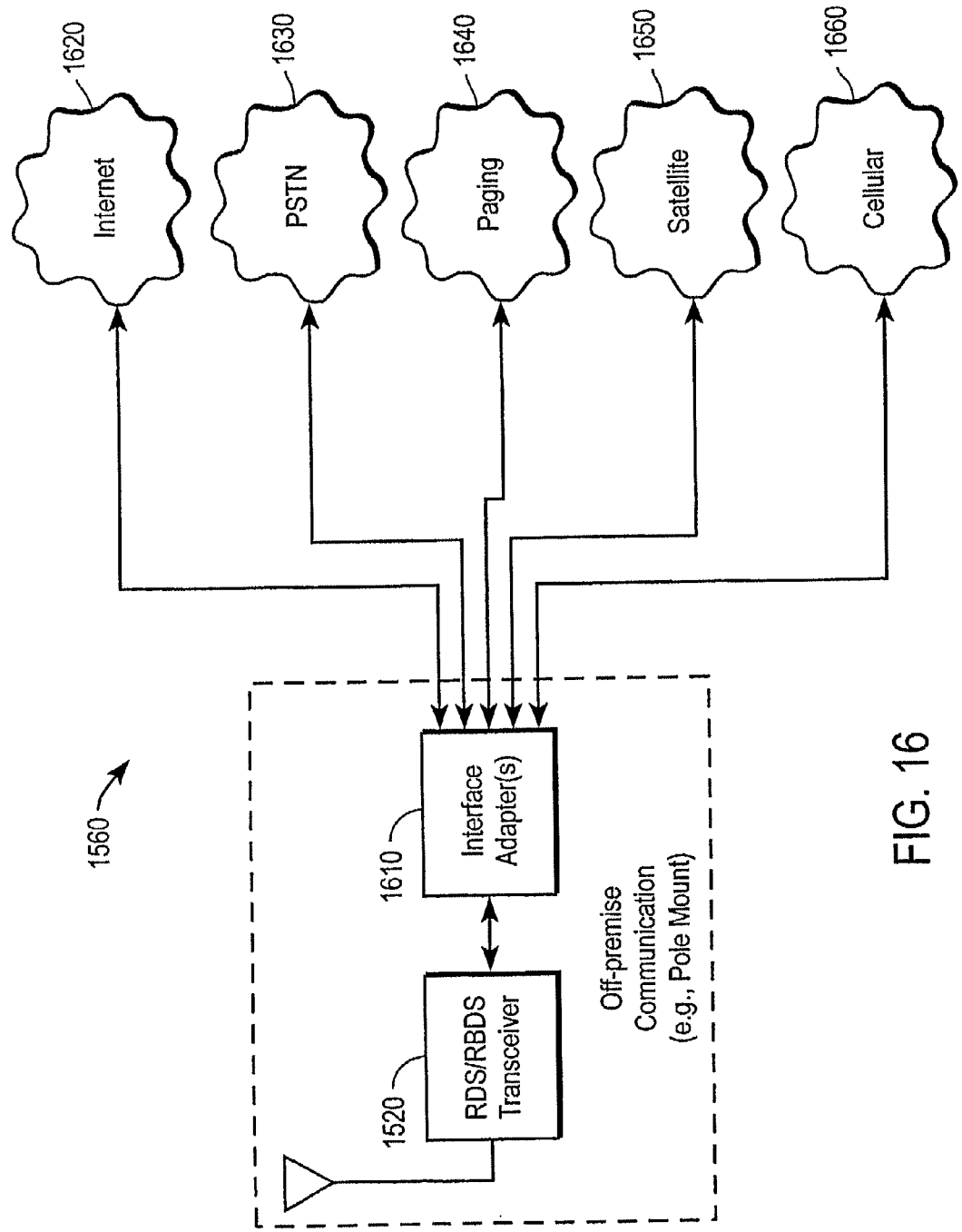
FIG. 16 illustrates a backhaul gateway for communicating messages from transceivers over various networks in accordance with an embodiment of the present invention.

An example of backhaul gateway 1560 is shown in more detail in FIG. 16. Gateway 1560 includes a transceiver for receiving data from one or more nodes over a PAN or LAN as described above, and transmitting the data over one or more communications network technologies. An adaptive interface 1610 provides an interface to the various communications networks, which may include, for example, the internet 1620, PSTN 1630, paging networks 1640, satellite 1650 or cellular networks 1660.

Exemplary cellular communication protocols that may be used by uplink transmitters presently include 1G, 2G, 2.5G, 2.75G, 3G, 3.5G 3.75G and 4G. However, the present invention contemplates future generations of cellular communication protocols and devices of the present invention can use all such communication protocols. Non-limiting exemplary cellular communication protocols are disclosed in Table 1.

TABLE 4

Exemplary communication protocols that may be employed in the present invention.

| Generation | Frequency | Technology | Emphasis | Remarks |
| --- | --- | --- | --- | --- |
| 1 | 800 MHz range | NMT<br>AMPS<br>Hicap<br>CDPD<br>Mobitex<br>Data Tac | Circuit-switched wireless analog voice. No data. | Limited system capacity and little protection against fraud |
| 2 | 800<br>900<br>1900 MHz range | FDMA<br>TDMA (IS-136)<br>CDMA<br>GSM<br>iDEN<br>D-AMPS<br>cdmaOne<br>PDC<br>CSD | Circuit-switched wireless digital voice and data<br>Better security and higher capacity | More support for data communications<br>SMS enabled |
| 2.5 | 1900 MHz range | GPRS<br>CDMA2000-1X<br>(1X MC)<br>HSCSD<br>WiDEN<br>EDGE | circuit-switched wireless digital voice + new packet-switched data services.<br>GPRS is an "always on" air interface to the Internet | SMS and EMS enabled |
| 3 G | 2 GHz | WCDMA<br>CDMA2000-3X<br>cdma2000 1xEV-DO<br>TD-SCDMA | packet-switched wireless voice and data services, encryption, high-speed multi-media | SMS, EMS, MMS enabled |
| 3.5<br>3.75 | | HSDPA<br>HSUPA | | |

As specified in table 4, some uplink transmitters in accordance with the present invention use 1G cellular communication protocols such as Nordic mobile telephone (NMT), advanced mobile phone service (AMPS), Hicap by Nippon Telegraph and Telephone, cellular digital packet data (CDPD), Mobitex, and DataTac.

Some transmitters for uplink or other wide area communication in accordance with the present invention use 2G cellular communication protocols such as frequency division multiple access (FDMA), time-division multiple access (TDMA), code division multiple access (CDMA), global system for mobile communications (GSM), integrated digital enhanced network (iDen), digial AMPS (D-AMPS), code division multiple access one (CDMAone), personal digital cellular (PDC), and circuit switched data (CSD).

Some transmitters for uplink or other wide area communication in accordance with the present invention use a 2.5G cellular communication protocol such as general packet radio service (GPRS), high-speed circuit-switched data (HSCSD), and wideband integrated dispatch enhanced network (WiDEN). GPRS is based on Internet Protocols and has a throughput of up to 40 kbit/s. GPRS provides data services such as color Internet browsing, e-mail, video streaming, multimedia messages and location-based services. Some transceivers in accordance with the present invention use a 2.5G cellular communication protocol such as CDMA2000-1X. CDMA2000-1X enables operators with existing IS-95 systems to double overall system capacity yielding uplink speeds up to 76.8 kbps and downlink speeds up to 153.6 kbps. CDMA2000 1X supports e-mail as well as access to the Internet and corporate networks. Some mobile devices 12 in accordance with the present invention use a 2.5G cellular communication protocol such as enhanced data for GSM evolution (EDGE). EDGE provides 3G packet data throughput on GSM networks, and uses a modulation scheme to enable data throughput speeds of up to 384 kbit/s using existing GSM infrastructures.

Some transmitters for uplink or other wide area communication in accordance with the present invention use a 3G cellular communication protocol such as wide band CDMA (WCDMA) or TD-SDCDMA. WCDMA has been designed for high-speed data services and more particularly, Internet-based packet-data offering up to 2 Mbps in stationary or office environments, and up to 384 Kbps in wide area or mobile environments. WCDMA offer voices, data, motion-video and other multimedia capabilities, and increases data transmission rates in GSM systems by using CDMA instead of TDMA. See *WCDMA for UMTS, Radio Access for Third Generation Mobile Communications*, John Wiley & Sons, West Sussex, England, 2000, Holma and Toskala eds., which is hereby incorporated by reference in its entirety. Some transmitters in accordance with the present invention use a 3G cellular communication protocol such as CDMA2000-3X. CDMA2000-3x utilizes a pair of 3.75-MHz radio channels (e.g., 3×1.25 MHz) to achieve higher data rates. The 3x version of CDMA2000 is sometimes referred to as Multi-Carrier or MC. Some mobile devices 12 in accordance with the present invention use a 3G cellular communication protocol such as CDMA2000 1xEV-DO. CDMA2000 1xEV-DO supports downlink (forward link) data rates up to 3.1 Mbit/s and uplink (reverse link) data rates up to 1.8 Mbit/s in a radio channel dedicated to carrying high-speed packet data. Some mobile devices 12 in accordance with the present invention use a 3G cellular communication protocol over a Universal mobile telecommunication services (UMTS) network.

Some transmitters for uplink or other wide area communication in accordance with the present invention use a 3.5G cellular communication protocol such as High-Speed Downlink Packet Access (HSDPA). HSDPA extends WCDMA in the same way that EV-DO extends CDMA2000. It is an evolution of the WCDMA standard and is designed to increase the available data rate by a factor of five or more. HSDPA defines a new WCDMA channel, the high-speed downlink shared channel (HS-DSCH) that operates in a different way from existing W-CDMA channels, but is only used for downlink communication to the mobile.

Some transmitters for uplink or other wide area communication in accordance with the present invention use a 4G cellular communication protocol such as HSUPA. HSUPA stands for High Speed Uplink Packet Access and describes a procedure for sending data through UMTS devices. HSUPA enables symmetrical data communications such as voice over internet protocol (VoIP) and interactive multimedia by better data rates and shorter delay. The suitable procedure for the receiving is HSDPA. Both HSUPA and HSDPA resemble each other technically and by the employment of special modulation procedures allow a higher extent of utilization of the net infrastructure.

Figure 17:
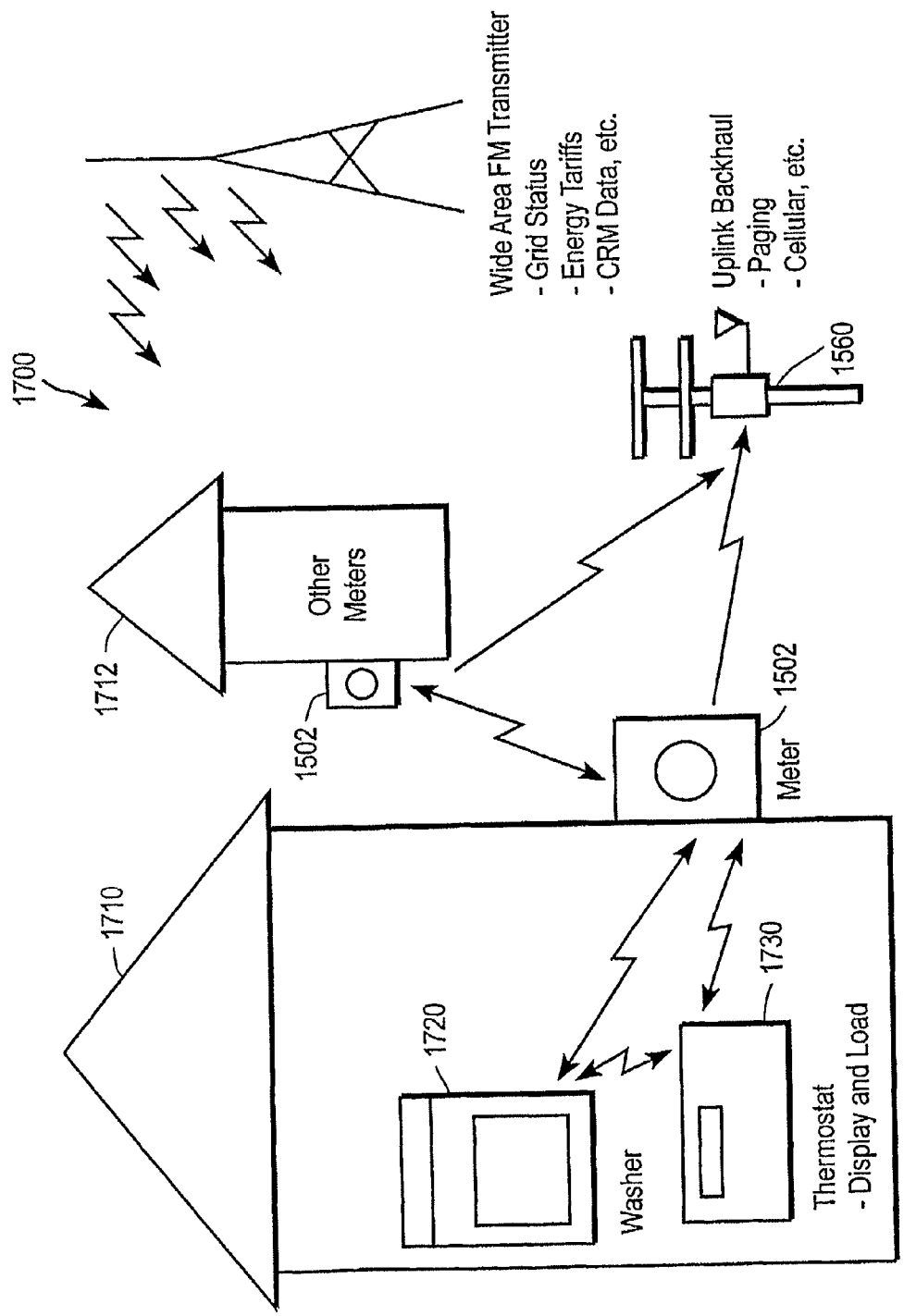
FIG. 17 illustrates an advanced meter infrastructure topology in accordance with an embodiment of the present invention.

FIG. 17 illustrates an example of an advanced meter infrastructure topology, including a number of nodes 1710 and 1712, which may correspond to one or more residences, offices, buildings, locations, or other physical or logical entities. In this example, each node 1710 includes appliances, e.g., washer 1720 and thermostat 1730, having embedded transceivers for receiving broadcast UMC messages from a wide area transmitter, such as, for example, a wide area FM transmitter 1750. As described in more detail above, the broadcast signals may include data such as power grid status, energy tariff information, and customer relationship management (CRM) data, etc. and for two-way local area communication with other appliances and with meter 1502 of node 1710. Meters 1502 preferably each have transceivers that are capable of receiving data from appliances 1720, 1730 and transmitting appliance and meter usage data, for example, between meters 1502 and to uplink gateway 1560.

In a preferred embodiment shown in FIG. 17, an Advanced Meter Infrastructure (AMI) topology 1700 employs a one or more two-way local area transceivers embedded within appliances 1720, 1730, for example, and one or more wide-area receivers at each network node 1502 to effect, for example, automatic meter reading (AMR), demand response (DR), tamper and outage detection, and customer relations management (CRM). The topology employs the local area two way/wide area one way transceiver along with different uplink and downlink communication links, as described above.

In a particular example, a residential or commercial communication networks can receive real time energy tariff and load control data from utilities (i.e. ISOs, LDCs. Retailers etc.) and can facilitate communication among energy measurement (i.e. meter), display, and energy consumption apparatus collocated within a building as well as backhaul gateways and other similar neighboring local area networks. In this example, a display may communicate with a meter 1502 and individual loads 1720, 1730 to reveal ongoing energy consumption data within the home. Furthermore, the meter, as well as each load would receive real time energy tariff data directly from the utilities, e.g., broadcast from wide area transmitter 1750. Meters 1502 could use this information to minimize data storage requirements, e.g., ongoing energy consumption costs could be calculated in real time and stored in a single accumulation register within the meter. This feature would be particularly useful in SPOT energy markets where energy prices continually change. The loads could use this information to reduce energy consumption during high price periods, or grid stress.

In other embodiments, home automation systems may be used to facilitate centralized control and monitoring of hardware apparatus (e.g. lighting) throughout the home. From time to time the embedded software with the hardware apparatus may need to be updated to fix bugs, enhance performance, or activate features. Two way local communication serves to interconnect the hardware apparatus with a centralized control system while wide area one-way communication facilitates the downloading of embedded software from the manufacturer.

The topology 1700 of FIG. 17 has several advantages. One such advantage is that the local communication is able to relay wide area information to individual nodes where wide area receipt may be otherwise impaired (e.g. due to shadowing or mutipath fading effects). Also, the same receiver hardware and software components are used for both wide area and local area communication. Advantages of this include a smaller footprint for the transceivers in comparison to using a separate receiver for each network function, and less complexity of design than other networked systems. Also, local area two way connectivity facilitates the consolidation of data across many homes.

This consolidation allows a single uplink to service a multitude of homes. Another advantage is that the AMI topology decouples uplink from the downlink to allow each to be optimized independently. For most AMI applications uplink data does not need to be transmitted in real time: uplink data may in fact be communicated with low priority during off-peak times. In contrast, the response time of the downlink data is preferably as fast as possible, especially during times of grid stress, for example.

In a preferred embodiment, the transmitter at each node, e.g., the transmitter within each meter 1502, relays information to the backhaul gateway 1560 in accordance with RDS/RBDS or IBOC standards, with one caveat. Unlike traditional RDS/RBDS or IBOC transmitters, the PAN transmitter only transmits on a need be basis. In this manner the same FM frequency channel may be shared by many local transmitters. In other embodiments, one or more other PAN or LAN wireless communication protocols may be used within and between nodes, for example, IBOC, RDS/RBDS or other radio frequency transmissions, WiFi (802.11), bluetooth, Zigbee, or any other wireless communication standards. In other embodiments, wired communications may be used.

IBOC transmissions may include a number of primary and secondary logical channels that can be configured and are suitable to carry utility message channel (UMC) data, much in the same way that such channels can be used to deliver CRM data as described, for example, in U.S. patent application Ser. No. 11/053,145, filed Feb. 5, 2005. In some embodiments, UMC receivers and/or transceivers described herein may include multiple channels, e.g., dual-channel transceivers. For example, multiple public channels and public broadcast information may be provided over RDS channels, and subscribed services may be provided over IBOC channels and formats.

In some embodiments, the IBOC system does (due to its significantly increased transmission data rate as compared to RDS/RBDS) provide for wide area broadcast of individual "utility validated" daily energy consumption data. IBOC systems may be beneficial, as it may not be practical to use just RDS/RBDS channels for this purpose, as it would require the coordination of too many radio stations to deliver data to urban communities. The use of RDS/RBDS for rural coverage, however, is a possibility.

6. CONCLUSION

All references cited herein are incorporated herein by reference in their entirety and for all purposes to the same extent as if each individual publication or patent or patent application was specifically and individually indicated to be incorporated by reference in its entirety for all purposes.

When introducing elements of the present invention or the embodiment(s) thereof, the articles "a," "an," "the," and "said" are intended to mean that there are one or more of the elements. The terms "comprising," "including," and "having" are intended to be inclusive and to mean that there may be additional elements other than the listed elements.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A system for managing a first appliance, the system comprising:
   a wireless communication system comprising a plurality of transmitters configured to broadcast one or more wireless signals, wherein each said wireless signal in said one or more wireless signals comprises utility information;
   a first receiver assembly in electrical communication with said first appliance, said first receiver assembly comprising a microcontroller;
   a receiving interface in electrical communication with said microcontroller for receiving said utility information broadcast by said wide-area wireless communication system;
   a display in electrical communication with said microcontroller for notifying a user of said utility information; and
   an input interface in electrical communication with said microcontroller for receiving instructions from said user on whether to alter usage of said first appliance after notifying said user of said utility information using said display.

2. The system of claim 1, wherein said first receiver assembly is imbedded within the appliance.

3. The system of claim 1, the system further comprising a plurality of receiver assemblies for controlling a plurality of appliances, the plurality of receiver assemblies including the first receiver assembly and the plurality of appliances including the first appliance, each receiver assembly in said plurality of receiver assemblies communicating with a respective appliance in said plurality of appliances in order to receive energy tariff information and control the respective appliance.

4. The system of claim 1, wherein said plurality of transmitters comprises a plurality of RDS/RBDS transmitters, and said receiving interface comprises an RDS/RBDS radio receiver, and said first receiver assembly further comprises:
   a memory in electrical communication with said microcontroller, said memory storing data for controlling the appliance in accordance with said instructions from said user; and
   wherein said RDS/RBDS radio receiver is configured for receiving the wireless signal broadcast by at least one of said plurality of transmitters.

5. The system of claim 4, wherein said first receiver assembly is embedded within the first appliance.

6. The system of claim 1, wherein the one or more wireless signals are encrypted and said first receiver assembly further comprises:
   an application filter for identifying the encrypted signal and passing said signal to said microcontroller; and
   a decryption engine for decrypting the encrypted signal.

7. The system of claim 1, wherein the one or more wireless signals is any of an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, an FM carrier wave, a high definition radio carrier wave, a TV signal or a satellite radio signal.

8. The system of claim 1, wherein the appliance is an air conditioner or heater regulated by a thermostat, a clothes dryer, a refrigerator, a freezer, a hot water heater, or a dishwasher.

9. The system of claim 1, wherein said one or more wireless signals comprises data concerning a power outage, wherein said data is coded for a particular group of customers and includes an estimated time to restore power.

10. The system of claim 1 further comprising a key that represents a geographical position of said system, wherein said key is used by said receiving interface to select from said utility information that utility information which corresponds to said geographical position.

11. The system of claim 10 wherein said key is programmed into said system using said input interface.

12. The system of claim 10 wherein said key is determined by using one or more properties of said one or more wireless signals.

13. The system of claim 12 wherein said one or more wireless signals are FM signals.

14. The system of claim 1, wherein said utility information is energy tariff, electrical grid status, gas rate, or water rate information.

15. A receiver assembly for managing an appliance, comprising:
   a receiver configured to receive a signal from a wide-area wireless communication system comprising a plurality of transmitters configured to broadcast one or more wireless signals, wherein each said wireless signal in said one or more wireless signals comprises utility information;
   a processor in electrical communication with said receiver and the appliance, said processor configured to control the appliance as a function of the utility information;
   a display in electrical communication with said processor for notifying a user of said utility information; and
   an input interface in electrical communication with said processor for receiving instructions from said user on whether to alter usage of said appliance after notifying said user of said utility information using said display.

16. The receiver assembly of claim 15, wherein said receiver and said processor are embedded within the appliance.

17. The receiver assembly of claim 15, wherein the appliance is an air conditioner or heater regulated by a thermostat, a clothes dryer, a refrigerator, a freezer, a hot water heater, or a dishwasher.

18. The receiver assembly of claim 15, wherein the appliance is an air conditioner or heater regulated by a thermostat, and said receiver and said processor are embedded within the thermostat.

19. The household electrical apparatus of claim 18 wherein said memory further comprises instructions for using the microprocessor to:
   locate said household electrical apparatus, using a key that represents the geographical position of said household electrical apparatus; and
   select from said grid data that grid data which corresponds to said geographical position.

20. The household electrical apparatus of claim 19 wherein said memory further comprises instructions for using the microprocessor to determine said key using said input interface.

21. The household electrical apparatus of claim 19 wherein said memory further comprises instructions for using the microprocessor to determine said key by using one or more properties of said broadcasted radio signals.

22. The household electrical apparatus of claim 21 wherein said broadcasted radio signals are FM signals.

23. The receiver assembly of claim 15, wherein the one or more wireless signals is any of an analog cellular signal, a digital cellular signal, a general packet radio service signal, an enhanced data rate for GSM evolution (EDGE) service signal, a Mobitex signal, two-way paging signal, a signal in the Ardis network, a satellite signal, a WiMAX signal, an AM carrier wave, an FM carrier wave, a high definition radio carrier wave, a TV signal or a satellite radio signal.

24. The receiver assembly of claim 15, wherein the receiver comprises an RDS/RBDS radio receiver.

25. The receiver assembly of claim 15, further comprising a memory in electrical communication with said processor, said memory storing data for controlling the appliance in accordance with said instructions from said user.

26. The receiver assembly of claim 15, further comprising a key that represents the geographical position of said receiver assembly, wherein said key is used by said processor to select tariff information which corresponds to said geographical position.

27. The receiver assembly of claim 26 wherein said key is programmed into said receiver assembly using said input interface.

28. The receiver assembly of claim 26 wherein said key is determined by using one or more properties of said one or more wireless signals.

29. The receiver assembly of claim 28 wherein said one or more wireless signals are FM signals.

30. The receiver assembly of claim 15, wherein said utility information is energy tariff, electrical grid status, gas rate, or water rate information.

31. A household electrical apparatus comprising:
   (a) a receiver;
   (b) a microprocessor;
   (c) an input interface; and
   (d) a memory, wherein the memory comprises instructions for using the microprocessor to:
      receive, via the receiver, broadcasted radio signals that include utility information;
      display, via a display device, said utility data; and
      receive, via the input interface, instructions from a user on whether to alter usage of the household electrical apparatus after notifying said user of said utility data using said display device.

32. The household electrical apparatus of claim 31, wherein the receiver is a RDS/RBDS or IBOC receiver.

33. The household electrical apparatus of claim 31, the apparatus further comprising an RDS/RBDS or IBOC transmitter in electrical communication with the microprocessor.

34. The household electrical apparatus of claim 31, wherein the receiver and the microprocessor are in a single package and share one or more hardware components.

35. The household electrical apparatus of claim 31, wherein the receiver facilitates Time Division Duplex (TDD) of an air medium to effect half duplex communication on a common sub-carrier frequency.

36. The household electrical apparatus of claim 31, wherein the receiver facilitates time division multiplexing of an air medium to effect half duplex intercommunication between three or more transceivers on a common sub-carrier frequency.

37. The household electrical apparatus of claim 31, wherein the receiver employs Carrier Sense Multiple Access with Collision Avoidance (CSMA/CA) to effect time division multiplexing of the air medium.

38. The household electrical apparatus of claim 31, wherein the receiver facilitates Frequency Division Multiplexing (FDM) of the air medium to effect half duplex intercommunication between three or more transceivers on different sub-carrier frequencies.

39. The household electrical apparatus of claim 31, wherein the receiver facilitates a Zigbee Protocol Stack.

40. The household electrical apparatus of claim 31, wherein said utility information is energy tariff, electrical grid status, gas rate, or water rate information.

41. The household electrical apparatus of claim 31, wherein the memory comprises instructions for using the microprocessor to communicate, via the transmitter, information about utility usage associated with the household electrical apparatus.

* * * * *